United States Patent [19]

Fujino et al.

[11] 4,096,375

[45] Jun. 20, 1978

[54] FLASH WELDING APPARATUS

[75] Inventors: Yoshiharu Fujino, Yokohama; Iwane Chiba, Soka; Toshimi Chiyonobu, Fukuyama; Tomihisa Takahata, Fukuyama; Yasuhiko Kachi, Fukuyama, all of Japan

[73] Assignee: Ishikawajima-Harima Jukogyo Kabushiki Kaisha, Tokyo, Japan

[21] Appl. No.: 670,561

[22] Filed: Mar. 25, 1976

[30] Foreign Application Priority Data

Nov. 14, 1975  Japan ............................. 50-136845

[51] Int. Cl.² ............................................. B23K 11/04
[52] U.S. Cl. ................................. 219/97; 219/101; 219/105
[58] Field of Search ................. 219/97, 100, 101, 103, 219/105; 228/24, 49

[56] References Cited

U.S. PATENT DOCUMENTS

| | | | |
|---|---|---|---|
| 2,665,530 | 1/1954 | Deffenbaugh | 219/84 X |
| 3,293,401 | 12/1966 | Williams et al. | 219/97 |
| 3,298,587 | 1/1967 | Seeloff et al. | 228/24 X |
| 3,469,064 | 9/1969 | Senn et al. | 219/101 |
| 3,909,580 | 9/1975 | Krakow | 219/105 X |
| 3,916,140 | 10/1975 | Clews | 219/100 |

Primary Examiner—Bruce A. Reynolds
Assistant Examiner—N. D. Herkamp
Attorney, Agent, or Firm—Scrivener, Parker, Scrivener & Clarke

[57] ABSTRACT

The present invention discloses a full-automatic flash welding apparatus wherein the trailing edge of the preceding strip and the leading edge of the succeeding strip are automatically accurately positioned, rigidly clamped and simultaneously cut off, the new trailing and leading edges are automatically machined and then butt welded, and thereafter the flash on the upper and lower surfaces of the joined strips is automatically removed.

20 Claims, 41 Drawing Figures

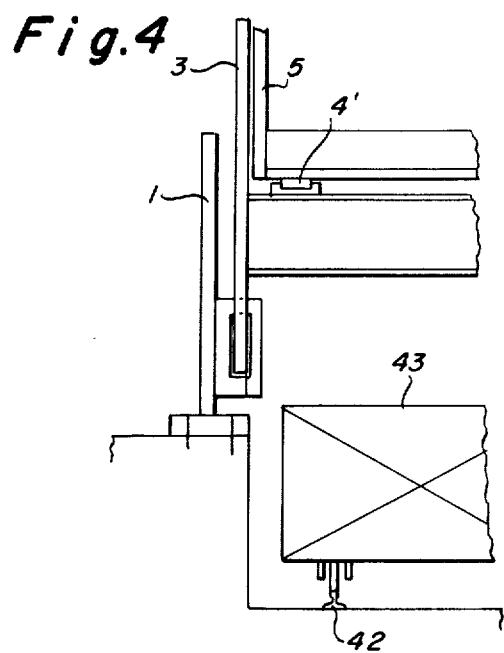
Fig. 4
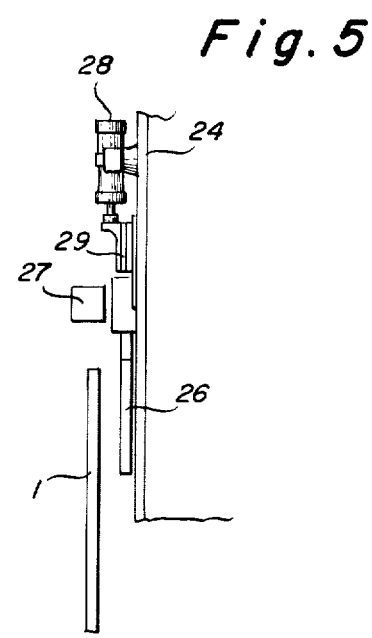
Fig. 5
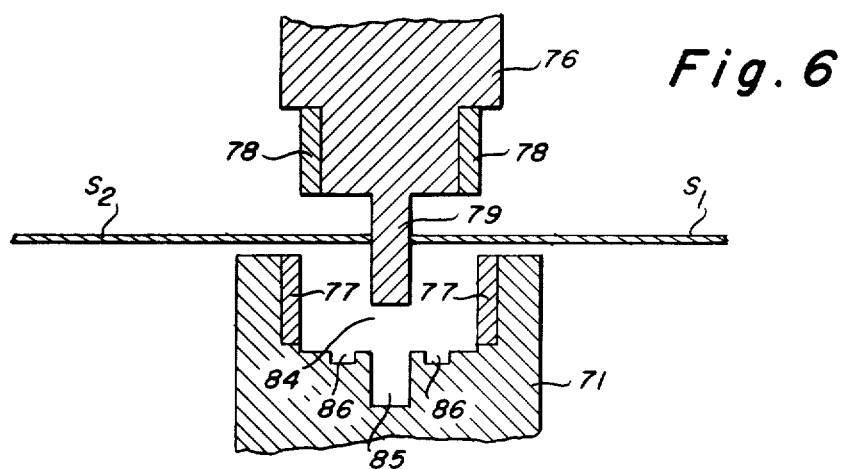
Fig. 6
Fig. 7

Fig. 11
Fig. 12
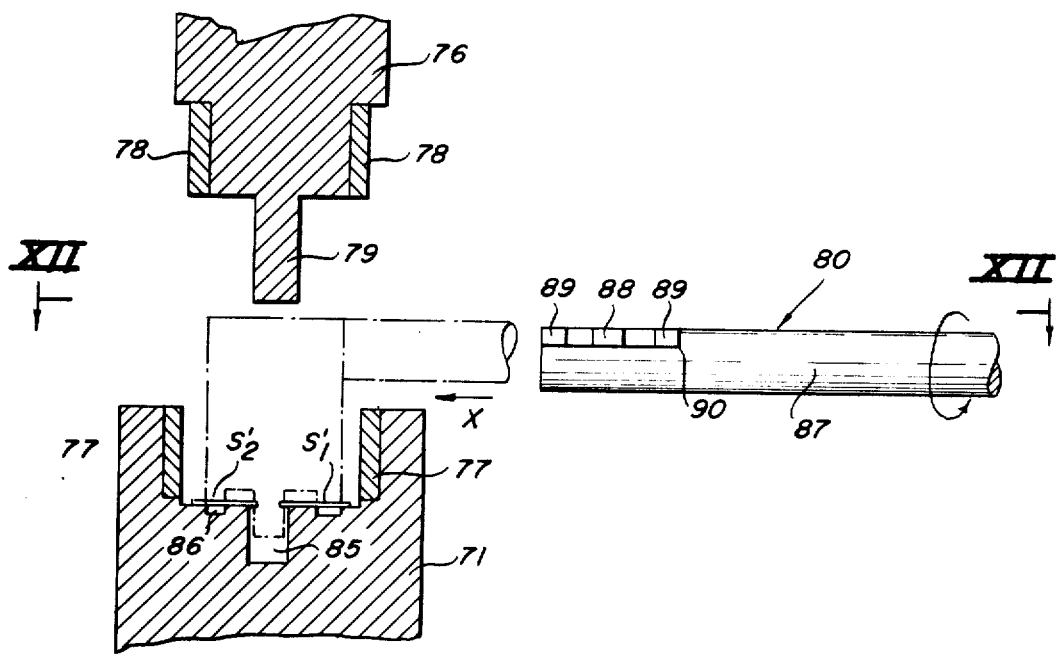
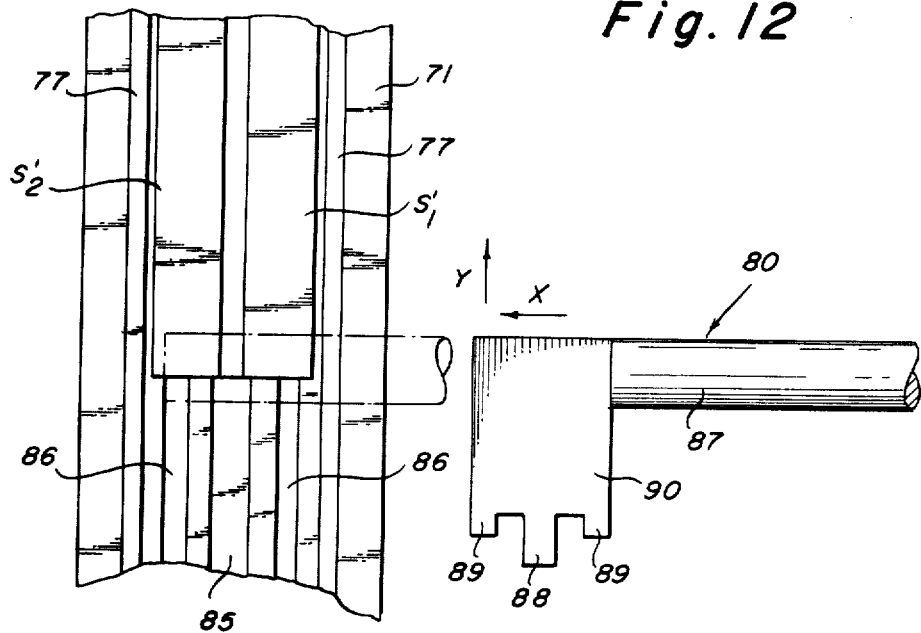

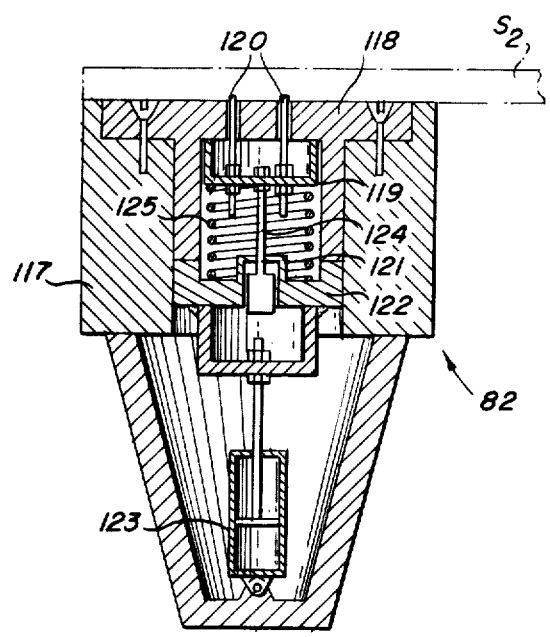
Fig. 19
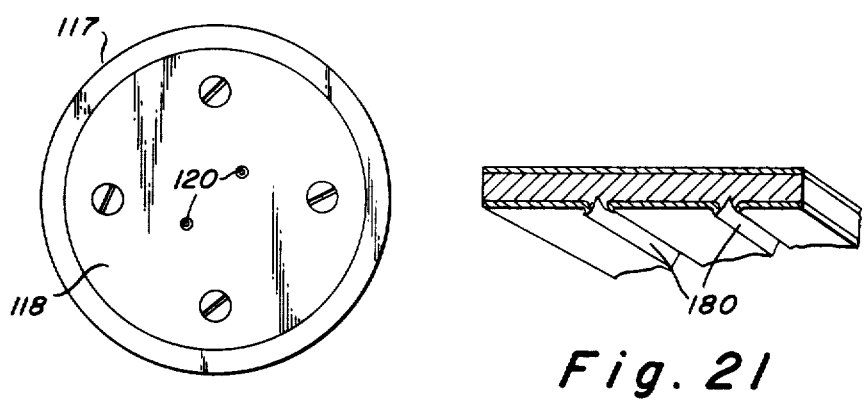
Fig. 20
Fig. 21

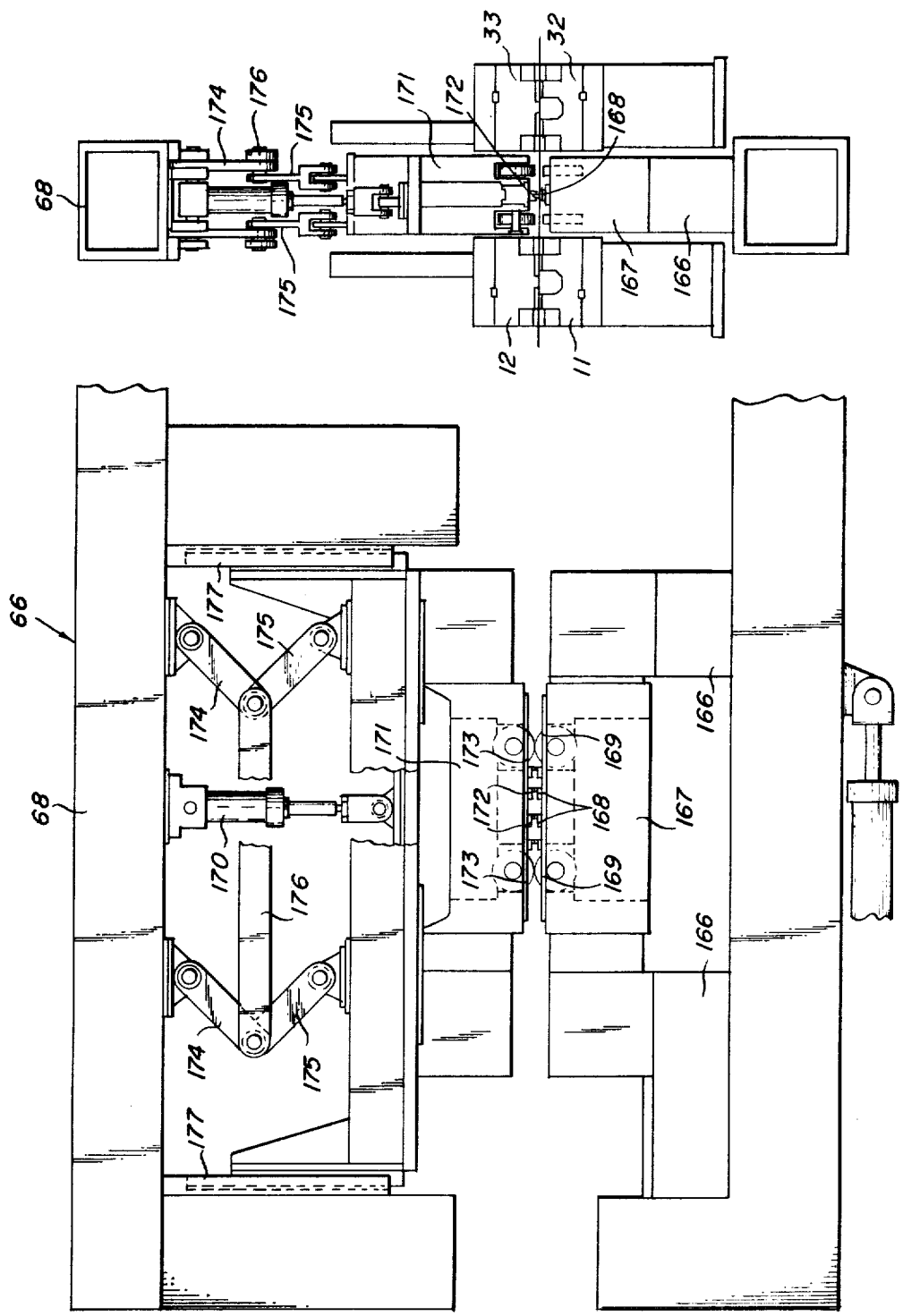

FLASH WELDING APPARATUS

DETAILED DESCRIPTION OF THE INVENTION

The present invention relates to a full-automatic flash welding apparatus which automatically and simultaneously cut off the trailing edge of the preceding strip and the leading edge of the succeeding strip, flash welds between the new trailing and leading edges and removes the flash.

In continuous steel strip production lines where various processing stations are lined, the strip must be continuously transported from one staton to another so that the trailing edge of the preceding strip must be joined by welding to the leading edge of the succeeding strip. In the past the trailing edge of the preceding strip and the leading edge of the succeeding strip are cut off outside of a welding machine, and thereafter the strips are brought into the welding machine and welded together. Therefore the preceding and succeeding strips cannot be aligned with each other with a required degree of accuracy. In welding the strips are rigidly clamped by welding electrodes, and the marginal length of the strips; that is, the length of the strip extended out of the electrodes is adjusted with a space bar or the like depending upon the thickness of the strips to be joined. Therefore the stepless adjustment of the marginal length was impossible. Furthermore, there arises a problem that when the trailing and leading edges strike against the space bar they may be damaged. Another problem is that the intimate contact between the trailing and leading edges and the spacer bar cannot be established so that the trailing and leading edges cannot be positioned accurately in parallel with each other and consequently the satisfactory weld cannot be obtained.

In view of the above, one of the objects of the present invention is to provide a flash welding apparatus capable of automatically welding at a high speed between the trailing edge of the preceding strip and the leading edge of the succeeding strip so that the highly reliable weld may be obtained.

Another object of the present invention is to provide a flash welding apparatus capable of automatically discharging crops after the leading and trailing edges of the strips to be joined are cut off and which can prevent the damages caused by the crops and scales.

A further object of the present invention is to provide a flash welding apparatus incorporating an electrode cleaning device for automatically cleaning the electrodes prior to the welding step.

The present invention will become more apparent from the following description of one preferred embodiment thereof taken in conjunction with the accompanying drawing, in which:

FIG. 4 is a view looking in the direction indicated by the arrow IV—IV of FIG. 1;

FIG. 5 is a view looking in the direction indicated by the arrows V—V of FIG. 1;

FIG. 6 is a fragmentary sectional view of a shear unit used for the explanation of a stopper used for positioning the leading and trailing edges of the strips to be joined;

FIG. 7 is a view similar to FIG. 6 showing the position of the stopper after the trailing and leading edges of the strips are cut off;

FIG. 11 is a sectional view used for the explanation of a crop discharge device for discharging the crops out of the flash welding apparatus;

FIG. 12 is a view looking in the direction indicated by the arrow XII of FIG. 11;

FIG. 19 is a vertical sectional view of the undersurface scribing device;

FIG. 20 is a top view thereof;

FIG. 21 shows the undersurface of the strip after it has been scribed by the undersurface scribing device;

FIG. 26 is a front view of a flash trimmer unit;

FIG. 27 is a side view thereof; and

Figure 1:
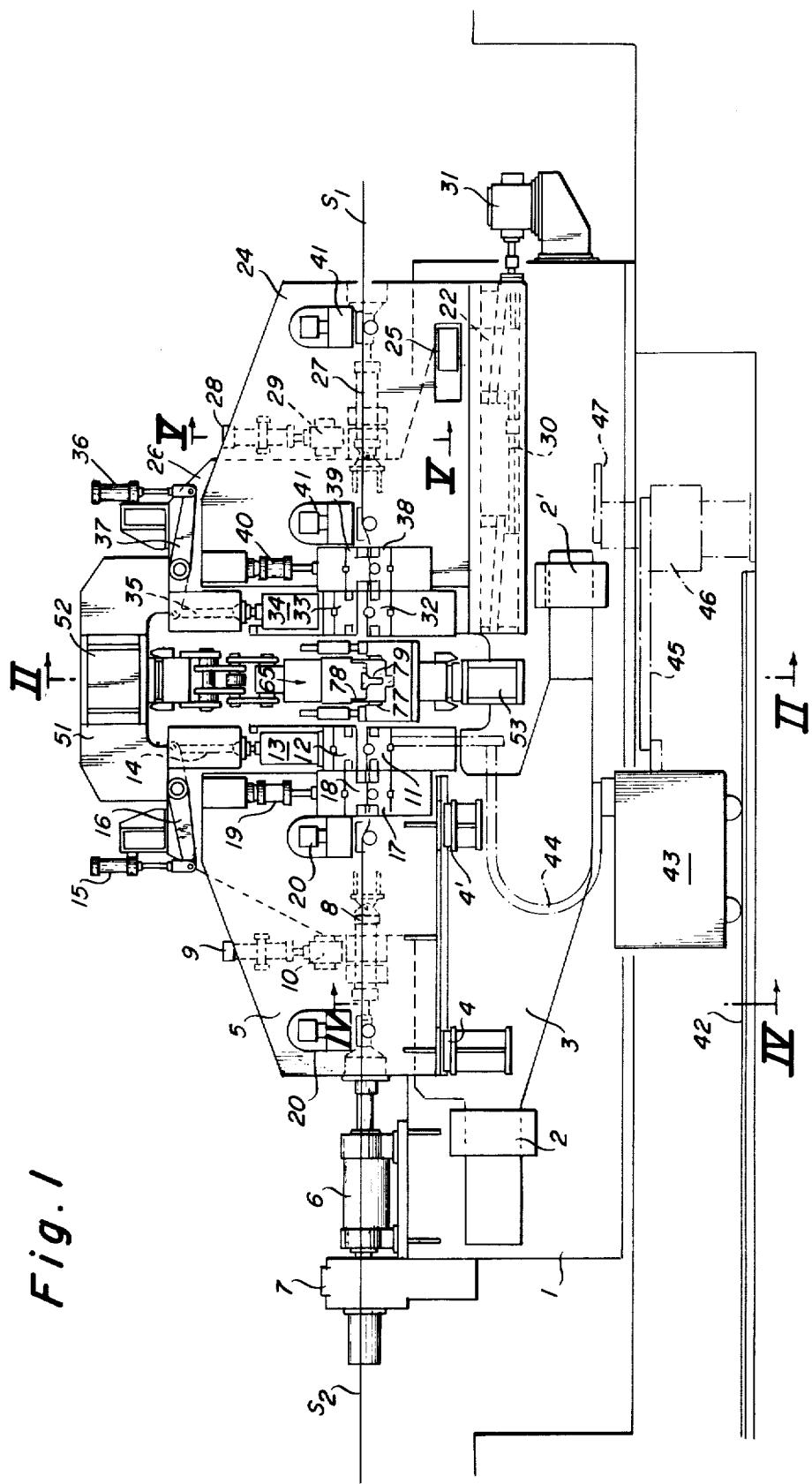
FIG. 1 is a schematic longitudinal sectional view of a flash welding apparatus in accordance with the present invention.

FIGS. 28(A) through (N) are views used for the explanation of the steps for welding between the trailing edge of the preceding strip and the leading edge of the succeeding strip.

In the description of the preferred embodiment of the present invention, terms such as "forwardly", "backwardly", "transversely" and "forward, rear and transverse directions" are used relative to the direction of the passage of the strip through the flash welding apparatus.

DESCRIPTION OF THE PREFERRED EMBODIMENT

Referring first to FIGS. 1 through 4, an entrance-side welding electrode frame 3 is supported by bearings 2 and 2' which in turn are securely attached to a welder bed 1 on a foundation. An entrance-side strip clamp mounting frame 5 is supported by sliding bearings 4 on a connecting beam of the entrance-side welding electrode frame 3.

On the entrance side of the welder bed 1 is disposed an upset cylinder 6 operatively coupled to a positioning device 7 for determining the stroke of the upset cylinder 6 whose rod is connected to the entrance-side strip clamp mounting frame 5. The free end of the rod of a welding electrode frame moving cylinder 8 mounted on the electrode frame 3 is connected to the entrance-side clamp mounting frame 5. As the upset cylinder 6 is extended or extracted, both the frames 3 and 5 are caused to be displaced in the forward or reverse direction in parallel with the passage of a strip ($S_1$ or $S_2$) to be referred as the "strip path" hereinafter in this specification.

An electrode frame holding cylinder 9 is mounted in the vertical position on the side wall of the entrance-side strip clamp mounting frame 5, and the lower end of the rod of the holding cylinder 9 is attached to an electrode holding block 10. Therefore, as the piston rod of the holding cylinder 9 is extended, the electrode holding block 10 is moved downward between the electrode mounting frame 3 and the clamp mounting frame 5 so that the relative movement therebetween in the direction of the strip path may be positively prevented.

Below the strip path a lower welding electrode 11 is mounted on the entrance-side electrode mounting frame 3 at the discharge side thereof, and an upper welding electrode 12 is vertically movably mounted in opposed relation with the lower electrode 11. The upper end of the upper electrode 12 is connected to an electrode clamping cylinder 13 which in turn is operatively coupled through a vertical link 14 and an arm 16 to a hydraulic cylinder 15 mounted on the electrode mounting frame 3.

A lower strip clamp 17 is mounted on the entrance-side strip clamp mounting frame 5 below the strip path at the strip discharge end of the mounting frame 5 at the downstream of the lower and upper electrodes 11 and 12. The upper end of an upper strip clamp 18 which is disposed in opposed relation with the lower strip clamp 17 is connected to the piston rod of a strip clamping cylinder 19 whose upper end is pivoted to the upper beam of the strip clamp mounting frame 5. Therefore the upper strip clamp 18 is vertically movable toward or away from the lower strip clamp 17.

Disposed at the strip entrance and discharge ends of the entrance-side strip clamp mounting frame 5 are side guides 20 which are adapted to displace the strip in the directions at right angles to the strip path $S_2$ so that the center line of the strip $S_2$ may be aligned with that of the flash welding apparatus prior to the clamping of the succeeding strip $S_2$.

Figure 2:
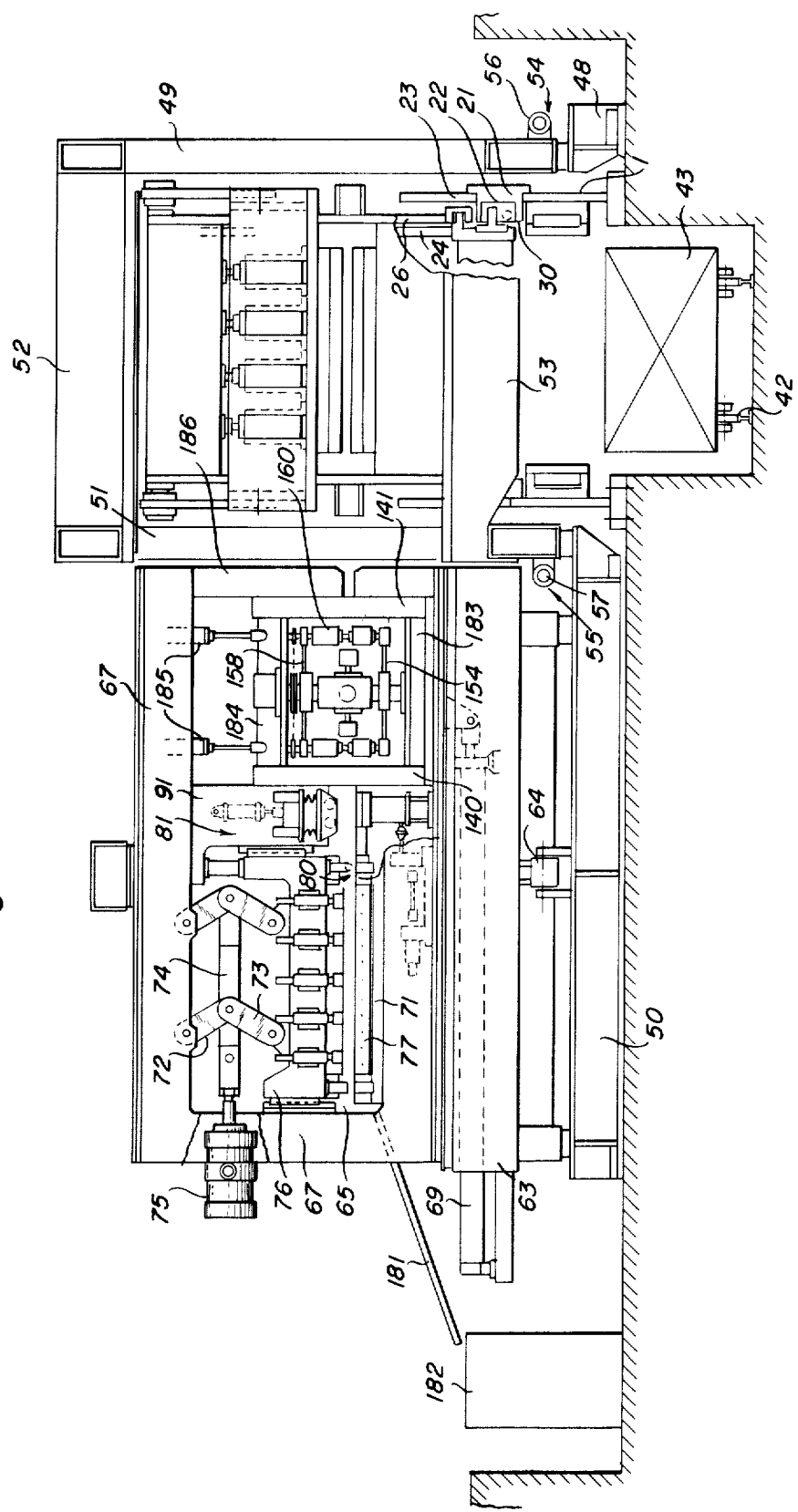
FIG. 2 is a view looking in the direction indicated by the arrows II—II of FIG. 1.

As best shown in FIG. 2, a cotter block 21 is attached on one side of the welder bed 1 at the strip discharge end thereof, and a supporting block 23 is carried by a cotter 22 fitted into the cotter block 21. A discharge-side strip clamp mounting frame 24 is mounted on the supporting block 23 in such a way that the strip mounting frame 24 may not be permitted to be displaced in the directions parallel with the direction of the strip path.

A discharge-side electrode mounting frame 26 is supported by a bearing 25 mounted on the side wall of the discharge-side strip clamp mounting frame 24, and is coupled to an electrode frame moving cylinder 27 whose piston rod is pivoted to the clamp mounting frame 24. Therefore the discharge-side electrode mounting frame 26 may be displaced in the direction in parallel with the direction of the strip path, and the distance between the entrance and discharge-side electrode mounting frames 3 and 26 when they are most closely moved toward each other may be maintained at a predetermined distance.

An electrode frame holding cylinder 28 is vertically mounted on the side wall of the strip clamp mounting frame 24, and its piston rod is connected to an electrode holding block 29. As the piston rod of the electrode frame holding cylinder 28 is extended, the electrode holding block 29 is displaced downward between the electrode and clamp mounting frames 26 and 24 so that the relative movement therebetween in the direction parallel to the direction of the strip path may be positively prevented.

One end of a threaded or screw rod 30 which is threaded through the cotter 22 is coupled to a threaded rod driving device 31 so that upon rotation of the threaded rod 30 the cotter 22 is displaced in either directions in parallel with the direction of the strip path and consequently the height of both the clamp and electrode mounting frames 24 and 26 may be suitably adjusted.

A lower welding electrode 32 is mounted on the discharge-side electrode mounting frame 26 at the strip entrance side thereof below the strip path, and a vertically movable upper electrode 33 is disposed in opposed relation with the lower electrode 32. The upper end of the upper electrode 33 is connected to an electrode clamping cylinder 34 which in turn is operatively coupled through a vertical link 35 and an arm 37 to a hydraulic cylinder 36 mounted on the discharge-side electrode mounting frame 26.

A lower strip clamp 38 is mounted on the discharge-strip clamp mounting frame 24 at the strip entrance side thereof and at the upstream of the upper and lower electrodes 33 and 32, and a vertically movable strip clamp 39 which is disposed in opposed relation with the lower clamp 38 has its upper end connected to the piston rod of an upper strip clamp clamping cylinder 40 whose upper end is pivoted to the upper beam of the discharge-side strip clamp mounting frame 24. Therefore the upper strip clamp 39 may be vertically movable toward or away from the lower strip clamp 38.

Disposed at the strip-entrance- and discharge-sides of the discharge-side strip clamp mounting frame 24 are side guides 41 which align the center line of the preceding strip $S_1$ with the center line of the flash welding apparatus prior to clamping thereof by displacing the strip $S_1$ in the directions at right angles to the direction of the strip path as with the case of the entrance-side side-guides 20.

Two parallel guide rails are laid over the bottom of a pit below the bottom of the welder bed 1, and a movable transformer unit 43 rides on the guide rails 42. This unit 43 carries an entrance-side connecting plate 44 which is directly connected to the lower electrode 11 and a discharge-side connecting plate 47 which is made into electrical contact with the discharge-side lower electrode 32. A discharge-side connecting plate clamp 46 is provided in order to ensure the positive electrical connection of the connecting plate 35 with the lower electrode 32 regardless of the position of the transformer unit 43.

A longitudinal base 48 whose upper surface servers as a sliding guide is laid over the foundation in parallel with the strip path as best shown in FIG. 2, and a gantry-shaped frame 49 rides on the guide of the longitudinal base 48. As best shown also in FIG. 2, a transverse base 50 whose upper surface serves as a sliding guide is laid over the foundation at right angles to the strip path and on the side opposite to the longitudinal base 48, and a gantry-shaped frame 51 rides on the guide of the transverse base 50.

The upper sides of the frames 49 and 51 are interconnected with an upper guide beam 52 while the lower sides are interconnected with a lower guide beam 53 which is located transversely in the space defined between the entrance and discharge-side electrode mounting frames 3 and 26.

Figure 3:
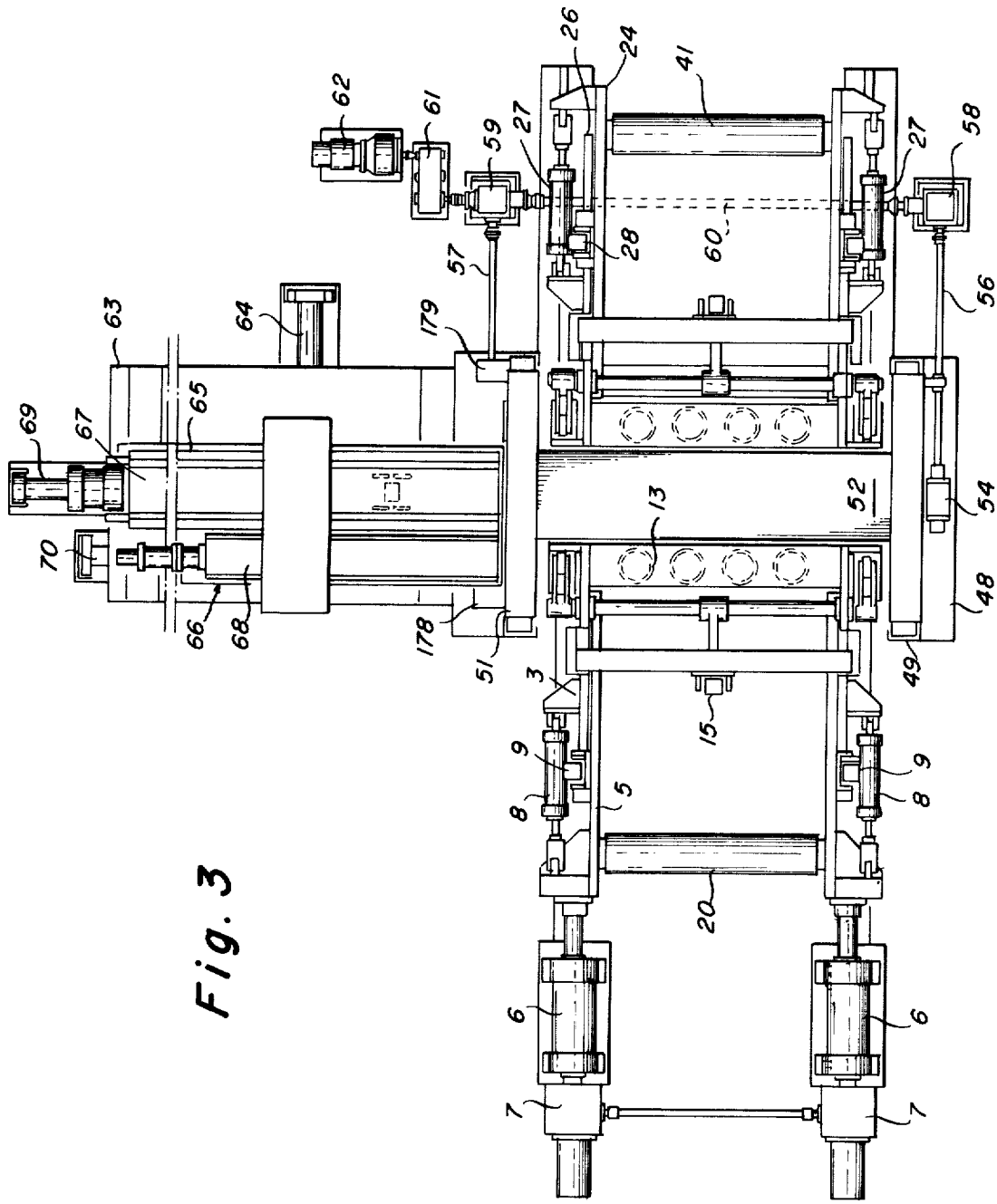
FIG. 3 is a top view thereof.

Referring particularly to FIG. 3, a positioning device 54 is attached to the frame 51 at the lower side thereof, and a screw rod 56 threaded into the positioning device 54 is drivingly coupled through a bevel gear box 58, an intermediates shaft 60, a bevel gear box 59 and a reduction gear 61 to a motor. In like manner a positioning device 54 mounted on the frame 52 at the lower side thereof is drivingly coupled through a screw rod 57 threaded therethrough, the bevel gear box 59 and the reduction gear 61 to the motor 62.

A carriage 63 rides over the sliding guide of the transverse base 50, and is operatively coupled to a carriage shifting cylinder 64. More particularly, the piston rod of the carriage shifting cylinder 64 is attached to the undersurface of the carriage 63, and is extended or extracted in the direction in parallel with the strip path as best shown in FIG. 3. It should be noted that the upper surfaces of th carriage 63 and the lower guide beam 523 flush with each other as best shown in FIG. 2.

Mounted upon the carriage 63 are a shear unit 65 including a crop discharge device 80 for discharging the strip crops through a crop chute 181 into a crop collection bucket 182 (see FIG. 2), a device 82 for scribing the undersurfaces of the strips $S_1$ and $S_2$ adjacent to their edges to be welded (which device 82 will be referred as the "undersurface scribing device" for brevity in this specification) and an electrode cleaning device 83 and a flash trimmer unit 66. One end of a shear unit moving cylinder 69 is attached to the carriage while the other end is attached to a frame 67 of the shear unit 65 (See FIGS. 2 and 3) so that the shear unit 65 may be moved transversely of the strip path as will be described in more detail hereinafter. In like manner, the flash trimmer unit 66 is moved transversely of the strip path by a flash trimmer unit moving cylinder 70.

Figure 8:
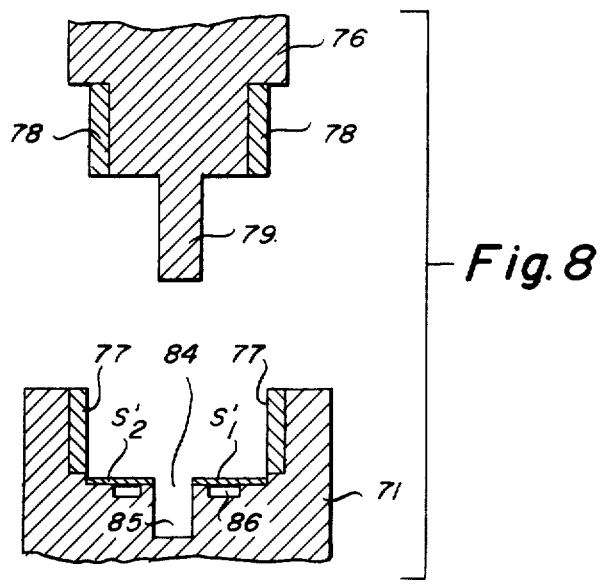
FIG. 8 is a view also similar to FIG. 6, but shows an upper cutter holder in raised position.

Referring to FIG. 6, 7 and 8, a lower cutter holder 71 is mounted on the lower side of the frame 67 of the shear unit 65 while a vertically movable upper cutter holder 76 is suspended in opposed relation with the lower cutter holder 76 from the upper side of the frame 67 through a linkage consisting of links 72, 73 and 74 (See FIG. 2). The linkage is so designed and arranged and coupled to a hydraulic cylinder 75 that as the piston rod of the cylinder 75 is extended or withdrawn the upper cutter holder 76 may be lowered or lifted.

Figure 9:
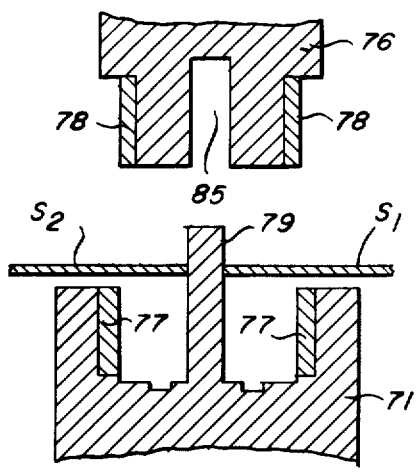
FIG. 9 is a fragmentary sectional view of a shear unit showing a stopper for positioning the leading and trailing edges of the strips to be joined, the stopper being shown as being extended form the lower cutter holder.
Figure 10:
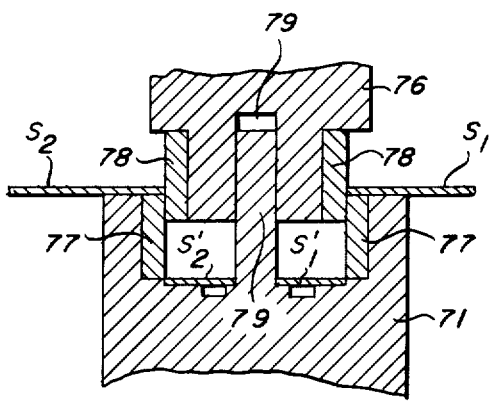
FIG. 10 is a view similar to FIG. 9 but shows the position of the stopper after the leading and trailing edges are cut off.

The lower cutter holder 71 has a transverse recess 70, and lower cutters 77 are attached to the side walls of the transverse recess 70. Formed in the bottom of the transverse are a transverse center groove 85 and two transverse grooves 86 which are spaced apart from the center groove 85 and extended in parallel therewith (that is, in the transverse direction relative to the strip path). The depth of the center groove 85 is made deeper than that of the grooves 86. Upper cutters 78 are attached to the side walls of the upper cutter holder 76 so that they coact with the lower cutters 77 to shear the strip $S_1$ or $S_2$ along a predetermined shear line as will be described in more detail hereinafter. A positioning stopper 79 is extended downward from the lower surface of the upper cutter holder 76 and is adapted to be fitted into the center groove 85 of the lower cutter holder 71 as shown in FIG. 7 so that the trailing edge of the strip $S_1$ or the leading edge of the strip $S_2$ may be accurately positioned as will be described in more detail hereinafter. Alternatively, as shown in FIGS. 9 and 10, the center groove 85 may be formed in the lower surface of the upper cutter holder 76 while the stopper 97 may be extended upright from the bottom of the transverse recess 84 of the lower cutter holder 71.

Next referring to FIGS. 11 and 12, the crop discharge device 80 for discharging crops $S_1'$ and $S_2'$ cut out of the trailing edge of the preceding strip $S_1$ and the leading edge of the succeeding strip $S_2$ will be described. The crop discharge device 80 is transversely movably carried by the frame 67 of the shear unit 65 on the front or rear side thereof. More particularly, the axis of a shaft 87 of the crop discharge device 80 is in parallel with the strip path, and the shaft 87 is so arranged as to be displaced in both the directions in parallel with and perpendicular to the strip path and to be rotated about its axis as well by suitable driving means (not shown). To the leading end of the shaft 80 is attached a crop discharging plate 90 with projections 88 and 89 which are fitted into the groove 85 and 86 of the lower cutter holder 71 as indicated by the broken lines in FIG. 11 and as will be described in more detail hereinafter.

Figure 13:
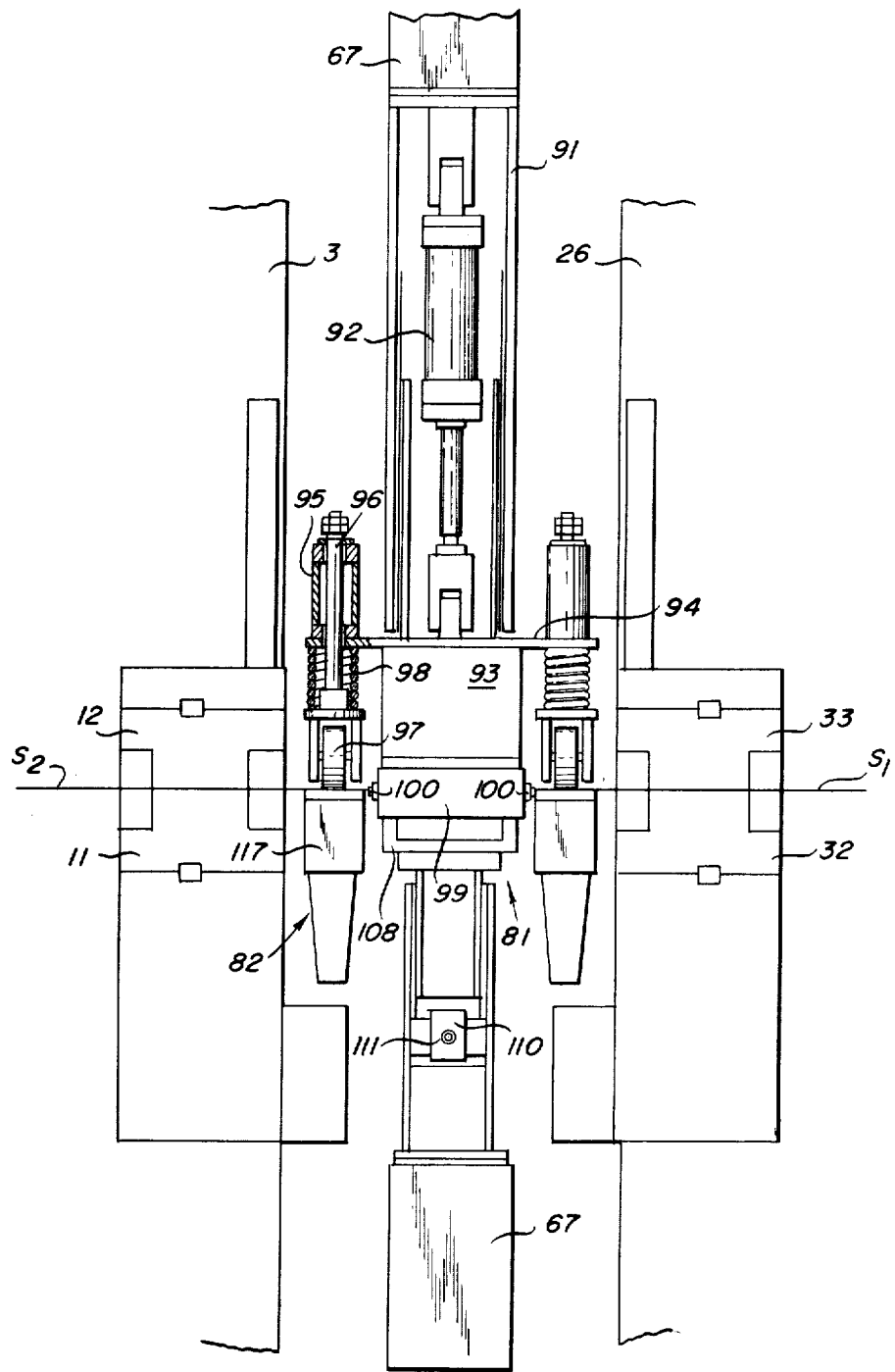
FIG. 13 is a front view of an edge preparation device and an undersurface scribing device mounted on a shear unit.
Figure 14:
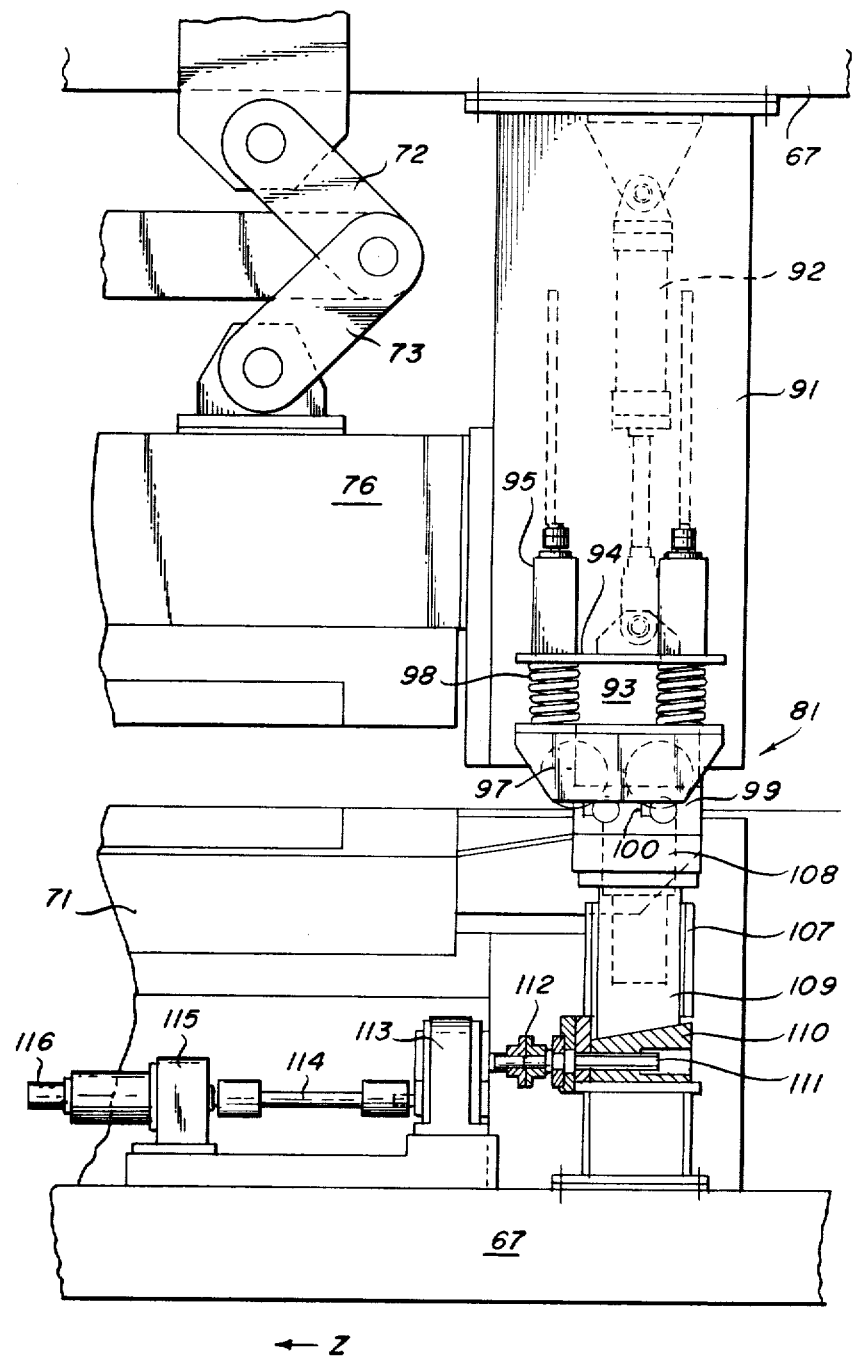
FIG. 14 is a side view thereof.

Next referring to FIGS. 13 through 17, an edge preparation device 81 mounted on the frame 67 on the side closer to the strip path of the shear device will be described. A downwardly extending guide 91 is attached to the upper beam of the frame 67, and within this guide 91 the upper end of a hydraulic cylinder 92 is attached to the top of the guide 91 while the piston rod of the cylinder 92 is pivoted to an upper lifting frame 93 so that the frame 93 may be vertically movable along the guide 91. Mounted on a bracket 94 attached to the lifting frame 93 are four upright hollow cylindrical guides 95. Two guides 95 are disposed on each side of the guide 91 (See FIG. 13), and are spaced apart from each other by a suitable distance in the transverse direction as shown in FIG. 14. Since the guides 95 and parts associated therewith are similar in construction, only one of them will be taken as an example. Within the guide 95 is disposed a vertically movable shaft 96 the lower end of which carries a strip holding roller 97 with the axis of rotation being in parallel with the strip path. A spring 98 is loaded between the lifting plate 93 and the flange of the guide 95 so that the strip holding roller 97 may be normally pressed against the upper surface of the strip $S_1$ or $S_2$ as best shown in FIG. 13.

Figure 15:
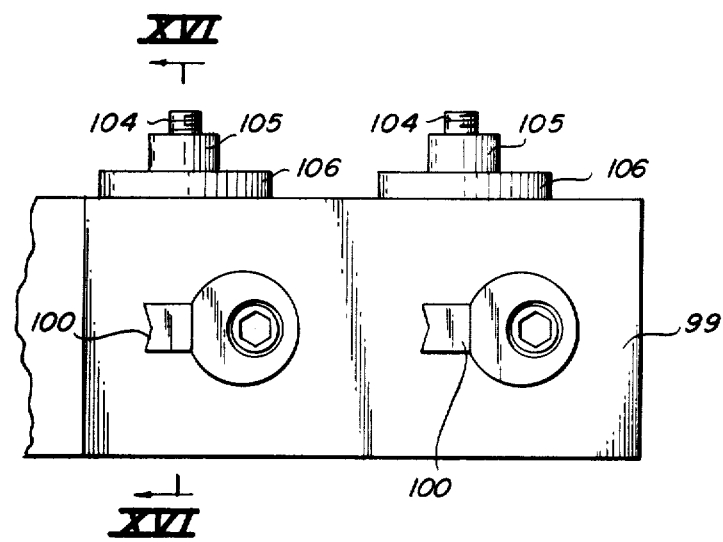
FIG. 15 is a side view of a tool holder of the edge preparation device.
Figure 16:
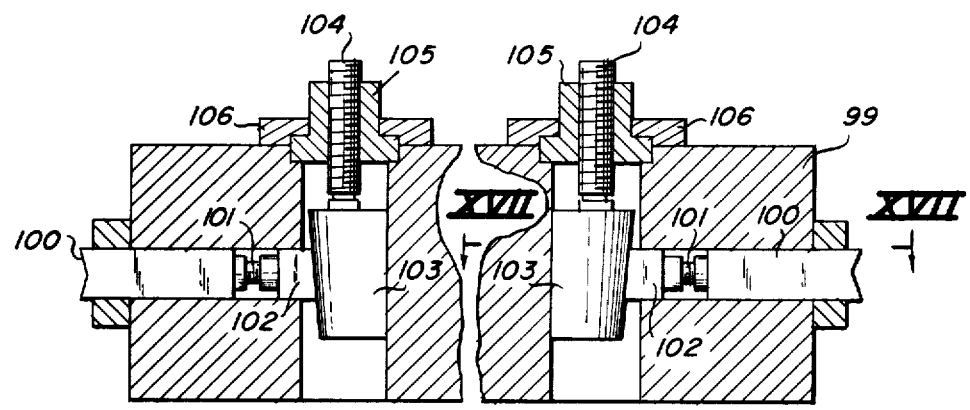
FIG. 16 is a sectional view taken along the line XVI—XVI of FIG. 15.
Figure 17:
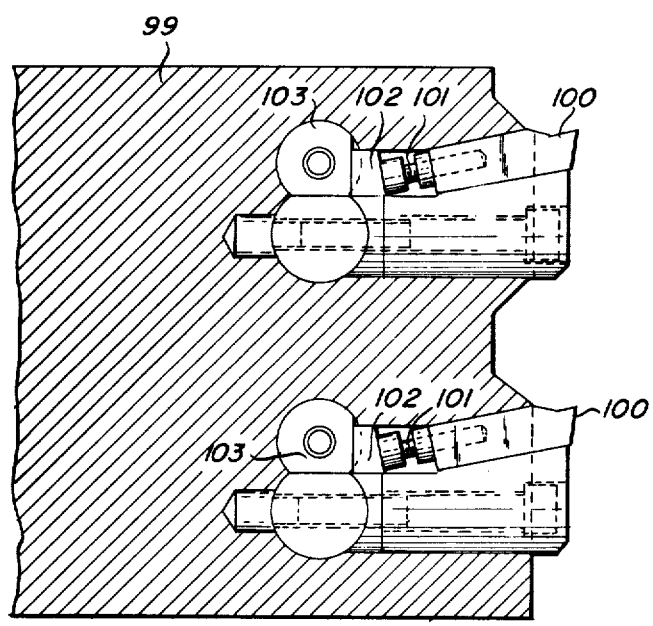
FIG. 17 is a sectional view taken along the line XVII—XVII of FIG. 16.

Attached to the lower end of the lifting frame 93 is a cutting tool holder 99 which carries cutting tools 100 with a V-shaped cutting edge for machining the trailing edge of the preceding strip $S_1$ and the leading edge of the succeeding strip $S_2$ for edge preparation for welding. As shown in FIGS. 15, 16 and 17, a bolt 101 is threaded into the rear end of the cutting tool 100 in order to adjust the overall length of the cutting tool 100. The bolt 101 has its rear end attached to a distance piece 102 whose side surface is made into contact with the tapered side surface of a wedge inserted into a vertical hole formed through the cutting tool holder 99 as best shown in FIG. 16. One end of a bolt 104 is attached to the upper end of the wedge 103 while the upper portion is threaded into a nut 105 which in turn is clamped in position by a nut retainer 106 fitted into the groove (not shown) formed in the upper surface of the tool holder 99.

Referring back to FIG. 14, a ram 109 with a tool holder positioning plate 108 is fitted into a guide 107 mounted on the lower side of the frame 67. The lower end surface of the ram 109 is made into contact with the tapered surface of a wedge 110 transversely slidably disposed in and extended out of a cut-out portion of the side wall of the guide 107. A screw rod 111 threaded into the wedge 110 is operatively coupled through a coupling 112, a reduction gear 113, and a shaft 114 to a motor 115 which in turn is operatively coupled to a pulse generator 116 for measuring the rotational speed of the screw rod 111.

Next referring to FIGS. 19, 20 and 21, the undersurface scribing device 82 will be described. Even though two scribing devices 82 are disposed at one side of the lower cutting holder 71, they are substantially similar in construction so that one of them will be taken as an example. A circular recess is formed at the top of a cylindrical member 117 attached to the lower cutter holder 71, and a circular undersurface supporting disk 118 with a downwardly extending hollow coaxial flange or cylindrical section is fitted into this circular recess and held in position with screws as shown in FIG. 20. A plurality (two in this embodiment) of scribers 120 are mounted on a tool holder 119 slidably fitted into the cylindrical section of the undersurface supporting disk 118, and are slidably fitted into holes 120 formed through the disk 118. Within the hollow cylindrical member 117 and below the cylindrical section of the undersurface supporting disk 118 is slidably fitted a guide 122 with a stopper 121, and the piston rod of a hydraulic cylinder 123 is pivoted to the lower end of the guide 122. The upper end of a rod 124 is attached to the tool holder 119 while the lower end terminates into an enlarged-diameter section which is fitted into a hole in the guide 122. A coiled spring 125 is loaded between the undersurface of the tool holder 119 and the guide 122 so that the scribers 120 are pressed against the undersurfaces of the strip under the force of the coiled spring 125. When the scribing device 82 scribes the undersurface of the strip, projections 180 are formed as shown in FIG. 21.

Next referring to FIGS. 22 through 25, the electrode cleaning device 83 mounted on the frame 67 on the side thereof most closely to the strip path will be described. The electrode cleaning device 83 is vertically movably suspended from the upper beam of the frame 67 through hydraulic cylinders 185, and includes a main body comprising vertical frames 140 and 141 interconnected with connecting beams 183 and 184. During the vertical movement of the electrode cleaning device 83, the side frames 140 and 141 are guided by the guides 91 and 186, respectively. Upper and lower bearing blocks 142 and 143 are mounted upon the upper and lower beans 184 and 183, respectively, and a motor 144 is mounted on the upper beam 184 immediately above the upper bearing block 142. The driving shaft of the motor 144 is coupled through a coupling 145 to an intermediate driving shaft 146 which is supported by bearings 148 within a hollow supporting shaft 147. A sprocket wheel 149 is keyed to the upper end of the intermediate driving shaft 146 whose lower end is coupled through a coupling 150 to an input shaft of a bevel gear box 151. Horizontal brushes 152 are keyed to the horizontal output shafts of the bevel gear box 151.

The upper end of the bevel gear box 151 is attached to the lower end of the hollow intermediate supporting shaft 147 while the lower end is attached to the upper end of a shaft 153 over which is rotatably fitted a lower vertical brush supporting arm 154. The lower arm of the shaft 153 is coupled through a lever 155 the piston rod of a swivel cylinder 156 pivoted to a bracket 157 which in turn is attached to the lower beam 183. Therefore when the swivel cylinder 156 is actuated, the shaft 153 is caused to rotate so that the bevel gear box 151 and the intermediate supporting shaft 147 are caused to swing as will be described in more detail hereinafter.

An upper vertical brush supporting arm 158 is rotatably carried by the upper end of the intermediate supporting shaft 147, and is supported by the upper bearing block 142. The lower vertical brush arm 154 is rotatably supported by the lower bearing block 143. Vertical brush shafts 159 are rotatably supported between the upper and lower vertical brush supporting arms 154 and 158 with bearings (not shown), and carry vertical brushes 160 keyed thereto. Sprocket wheels 161 carried by the vertical brush shafts 159 at the upper ends thereof are drivingly coupled with an endless chain 162 to the sprocket 149 carried by the intermediate driving shaft 146, so that the rotation of the intermediate driving shaft 146 may be transmitted to the vertical brush shafts 159 for rotation of the vertical brushes 160.

One end of a coiled spring 163 is attached to the upper vertical brush supporting arm 158 while the other end is attached to the bevel gear box 151. In like manner, one end of a coiled spring 164 is engaged with the lower vertical brush supporting arm 154 while the other end, with the lower end surface of the bevel gear box 151. Therefore when the swivel cylinder 156 is actuated to cause the rotation of the bevel gear box 151, both the coiled springs 163 and 164 are twisted so that the lower and upper vertical brush supporting arms 154 and 158 are rotated and consequently the vertical brushes 160 are pressed against the side surfaces of the electrodes 11, 12, 32 and 33.

Figure 24:
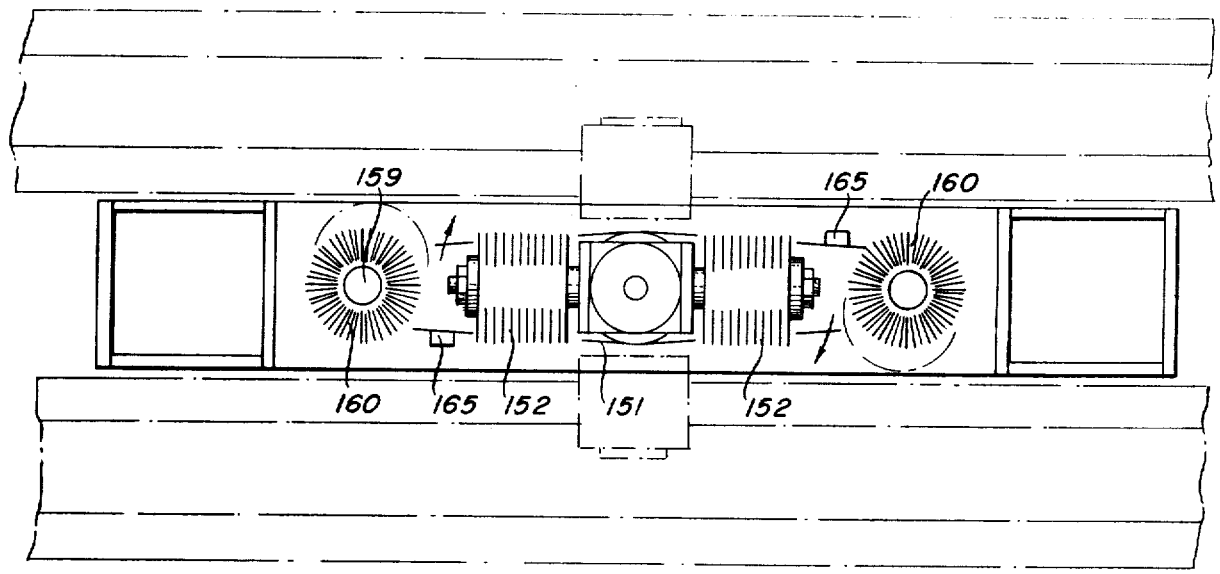
FIG. 24 is a top view thereof.
Figure 25:
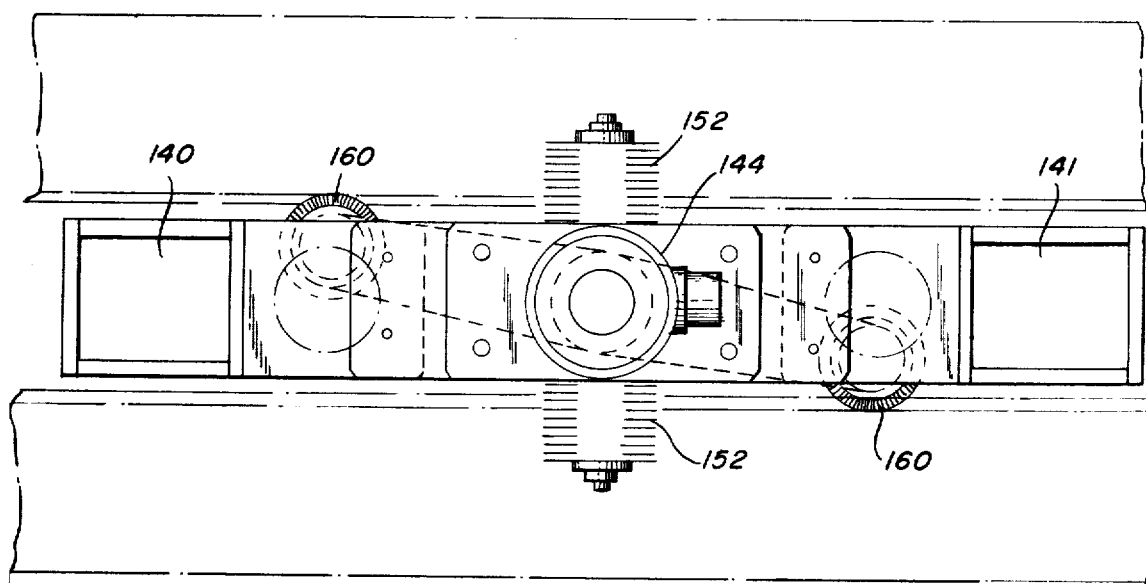
FIG. 25 is a view similar to FIG. 24 but shows cleaning brushes in operative position.

As shown in FIG. 24, a stopper 165 is provided for retaining the lower and upper vertical brush supporting arms 154 and 158 in the inoperative position.

Next referring to FIGS. 26 and 27, the flash trimmer unit 66 will be described. Lower cutting tools or bits 168 are held on the upper surface of a lower tool holder 167 mounted on frames 166 which in turn are mounted on the lower side of the frame 68. The lower cutting tools 168 remove the flash produced when the leading edge of the succeeding strip and the trailing edge of the preceding strip are flash welded. Two rollers 169 are rotatably carried by the lower tool holder 167 on each side thereof as best shown in FIG. 26, and are spaced part from each other by a suitable distance in the transverse direction.

In opposed relation with the lower tool holder 167 is disposed a vertically movable upper tool holder 171 with cutting tools 172 and upper rollers 173. The upper tool holder is suspended through a linkage consisting of links 174, 175 and 176 and a hydraulic cylinder 170 from the upper beam of the frame 68 in such a way that when the piston cylinder of the cylinder 170 is extended or retracted the upper tool holder 171 may be lowered or lifted while maintaining the horizontal position with respect to the lower tool holder 167. In order to ensure the precise vertical movement of the upper tool holder 171, the upright side members thereof are fitted into guides 177 formed in the side beams of the frame 68.

Referring back to FIG. 3, reference numerals 178 and 179 designate stoppers for the carriage 63.

Next the mode of operation of the flash welding apparatus with the above construction will be described in conjunction with the steps for flash welding between trailing edge of the preceding strip $S_1$ and the leading edge of the succeeding strip $S_2$ with particular reference to FIGS. 28(A) through 28(N). When the preceding strip $S_1$ is being transported through the flash welding apparatus to the next station, both the shear unit 65 and the flash trimmer unit 66 are retracted out of the strip path. The hydraulic cylinders 15 and 36 and the electrode clamping cylinders 13, 34, 15 and 36 are so actuated that both the entrance- and discharge-side upper electrodes 12 and 33 are lifted and maintained in the upper inoperative position. In like manner, the strip clamp cylinders 19 and 40 are so actuated that the upper strip clamps 18 and 39 remain in the upper position. The electrode frame moving cylinders 8 and 27 are retracted so that the entrance-side electrodes 11 and 12 are brought to the position very close to the entrance-side strip clamps 17 and 18, respectively, while the discharge-side electrodes 32 and 33, are brought to the position very close to the discharge-side strip clamps 38 and 39, respectively. The entrance- and discharge-side guides 20 and 41 are also deactivated. The stroke of the upset cylinder 6 is previously determined by the position setting device 7 so that the distance between the entrance-side electrodes 11 and 12 and the discharge-side electrodes 32 and 33 may be suitably selected depending upon the thickness of the strip. The driving motor 62 is energized so that the gantry-shaped frames 49 and 51 may be displaced in the direction parallel to the strip path so that both the upper and lower beams 52 and 53 may be located substantially at the midpoint between the entrance- and discharge-side electrodes. FIG. 28(A) shows these conditions.

Next the carriage shift cylinder 64 is actuated to displace the carriage 63 in the direction opposite to the direction in which the strip $S_1$ is being transported so that the axis of the shear unit moving cylinder 69 may be in line with the axes of the upper and lower guide beams 52 and 53. When the trailing edge of the preceding strip $S_1$ passes beyond the discharge-side electrodes 32 and 33 and the discharge-side clamps 38 and 39, the cylinders 185 of the electrode cleaning device 83 (See FIG. 22) are extended to lower the cleaning device 83, and then the swivel cylinder 156 is extended to cause the rotation of the bevel gear box 150 through 90° so that the coiled springs 163 and 165 are twisted and the vertical brush supporting arms 158 and 154 are rotated in the directions indicated by the arrows in FIG. 24 to the position shown in FIG. 25. Thereafter the shear unit moving cylinder 69 is extended to move the shear unit 65 into the strip path.

When the shear unit 65 is being moved into the strip path, the driving motor 144 is energized so that both the vertical and horizontal brushes 160 and 152 are rotated to clean the side and clamping surfaces of the lower electrodes 11 and 32 and the upper electrodes 12 and 33. The lower side of the frame 67 of the shear unit 65 is guided along the upper surface of the lower guide beam 53 while the upper side of the frame 67 is guided along the lower surface of the upper guide beam 52 so that the shear unit 65 may be accurately positioned within the strip line transversely thereof. Thereafter, the cylinders 185 of the electrode cleaning device 83 are retracted to raise the device 83.

While the above steps are being carried out, the preparation for transporting the succeeding strip $S_2$ is made. When the trailing edge of the preceding strip $S_1$ passes beyond the shear unit 65, the strip $S_1$ is stopped in response to the signal from a sensor (not shown) adapted to detect the position of the trailing edge of the preceding strip $S_1$. Thereafter, the hydraulic cylinder 75 of the shear unit 65 is retracted to some extent so that the upper cutter holder 76 and hence the stopper 79 are lowered to the position shown in FIG. 6 where the stopper's lower end is slightly below the preceding strip $S_1$. (See FIG. 28(B))

Thereafter a bridle roller (not shown) is rotated so that the preceding strip $S_1$ is transported in the reverse direction until the trailing edge thereof engages with the stopper 79 while the succeeding strip $S_2$ is transported in the forward direction until its leading edge engages with the rear surface of the stopper 79. (See FIG. 28(C))

When the stopper 79 is extended from the lower cutter holder 71, the holder 71 is raised slightly above the strip path or line as shown in FIG. 9 to adjust the positions of the trailing and leading edges of the strips.

After the trailing edge of the preceding strip $S_1$ and the leading edge of the succeeding strip $S_2$ having been positioned in the manner described above, the entrance- and discharge-side guides 20 and 41 are driven so that the preceding and succeeding strips $S_1$ and $S_2$ are aligned with each other. Thereafter the strip clamp cylinders 19 and 40 are actuated to lower the upper strip clamps 18 and 39 are moved downward toward the lower strip clamps 17 and 38 so that the succeeding strip $S_2$ is rigidly clamped between the upper and lower strip clamps 18 and 17 while the preceding strip $S_1$, between the upper and lower strip clamps 39 and 38. If required, the hydraulic cylinders 15 and 36 are retracted to lower the electrode clamping cylinders 13 and 34 and the upper electrodes 12 and 13, and then the electrode clamping cylinders 13 and 34 are extended so that the succeeding strip $S_2$ is further rigidly clamped between the lower and upper electrodes 11 and 12 while the preceding strip $S_1$, between the lower and upper electrodes 32 and 33. Whether the strips are clamped by both the clamps and electrodes or not is depending upon the thickness of the strips. In this embodiment, it is assumed that the strips are clamped by both the clamps and electrodes. (See FIG. 2((D)).

When the thickness of the preceding strip $S_1$ is different from that of the succeeding strip $S_2$, the driving device 31 is energized to rotate the screw rod 30, thereby displacing the cotter 22 forwardly or backwardly until the discharge-side strip clamp mounting frame 24 and the discharge-side electrode mounting frame 26 are brought to a height as to permit the optimum flash welding between the strips $S_1$ and $S_2$.

After the preceding and succeeding strips $S_1$ and $S_2$ having been clamped in the manner described above, the hydraulic cylinder 75 of the shear unit 65 is retracted to lower the upper cutter holder 75 so that the lower and upper cutters 77 and 78 coact to shear off simultaneously the trailing edge of the preceding strip $S_1$ and the leading edge of the succeeding strip $S_2$. (See FIG. 28(E)). Thereafter, the hydraulic cylinder 78 is extended fully to raise the upper cutter holder 76. The crops or cut-off portions $S_1'$ and $S_2'$ drop onto the bottom of the transverse recess of the lower cutter holder over the grooves 86 as shown in FIG. 8. It should be noted that the stopper 79 is inserted into the center groove 85 when the upper cutter holder is lowered for shearing the strips.

While the shearing step proceeds in the manner described above, the motor 115 of the edge preparation device 81 is energized to rotate the screw rod 111, thereby transversely displacing the wedge 110 and consequently adjusting the height of the ram 109 depending upon the thickness of the preceding strip $S_1$. Therefore the height of the tool holder positioning plate 108 is adjusted. Thereafter the hydraulic cylinder 92 is actuated to lower the tool holder 99 until the holder 99 rests upon the tool holder positioning plate 108 so that the axis of the cutting tool 100 may be aligned with the center line in the direction of thickness of the strip (See FIGS. 13 and 14). The number of rotations of the screw rod 111 may be controlled in response to the signal from the pulse generator 116 while the extension or projection of the cutting tool 100 from the side surface of the tool holder 99 may be adjusted by the rotation of the nut 105 depending upon a desired depth of cut.

Next the hydraulic cylinder 123 of the undersurface scribing device 82 is actuated to raise the supporting guide 122 until the upper end of the guide 122 is made into contact with the lower end of the undersurface supporting disk 18 so that the upper ends of the scribers 120 may be extended very slightly above the upper surface of the disk 118 (See FIG. 19).

Figure 18:
FIG. 18 shows the edge of the strip prepared by the edge preparation device.
Figure 22:
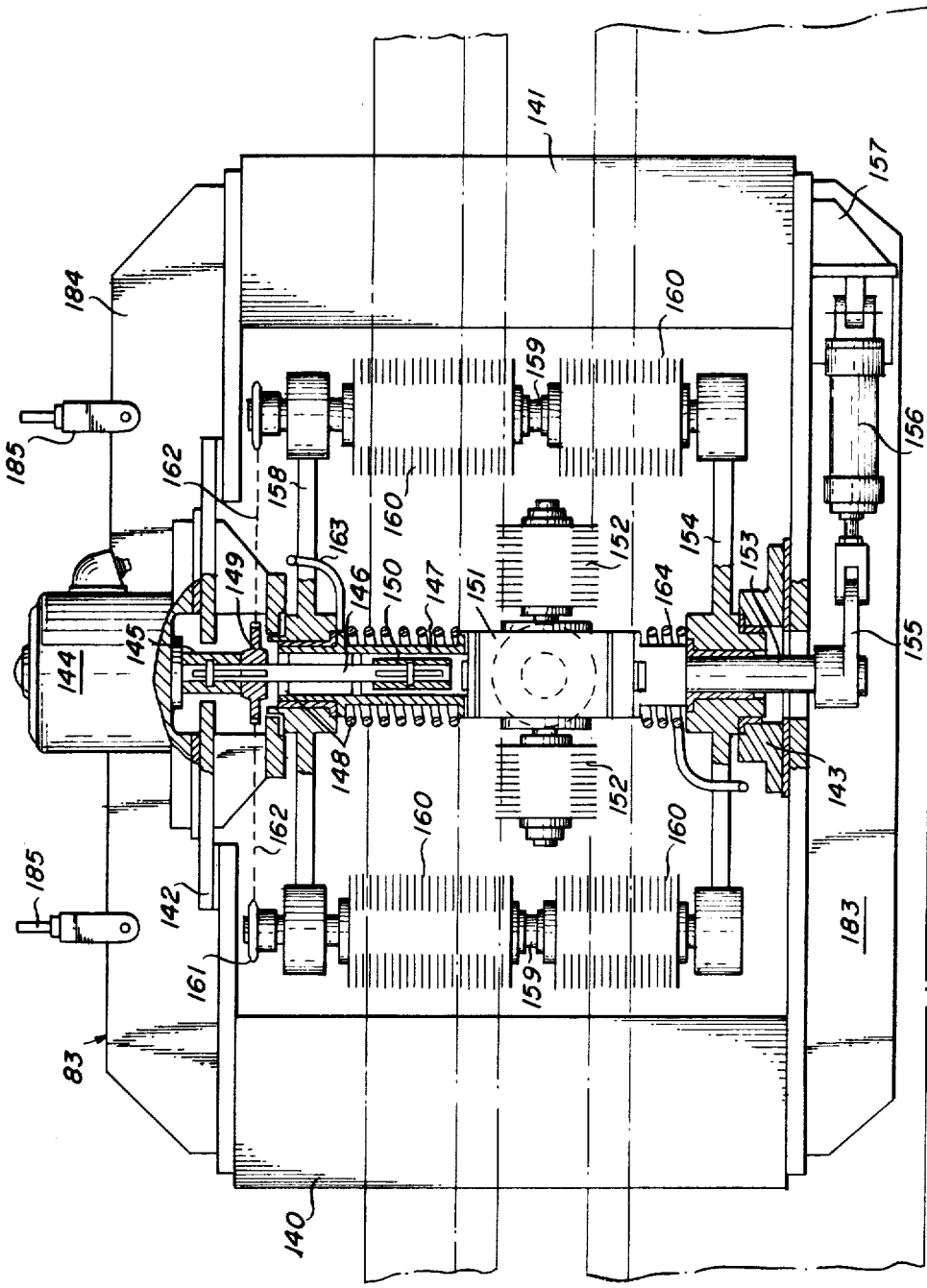
FIG. 22 is a front view of an electrode cleaning device.
Figure 23:
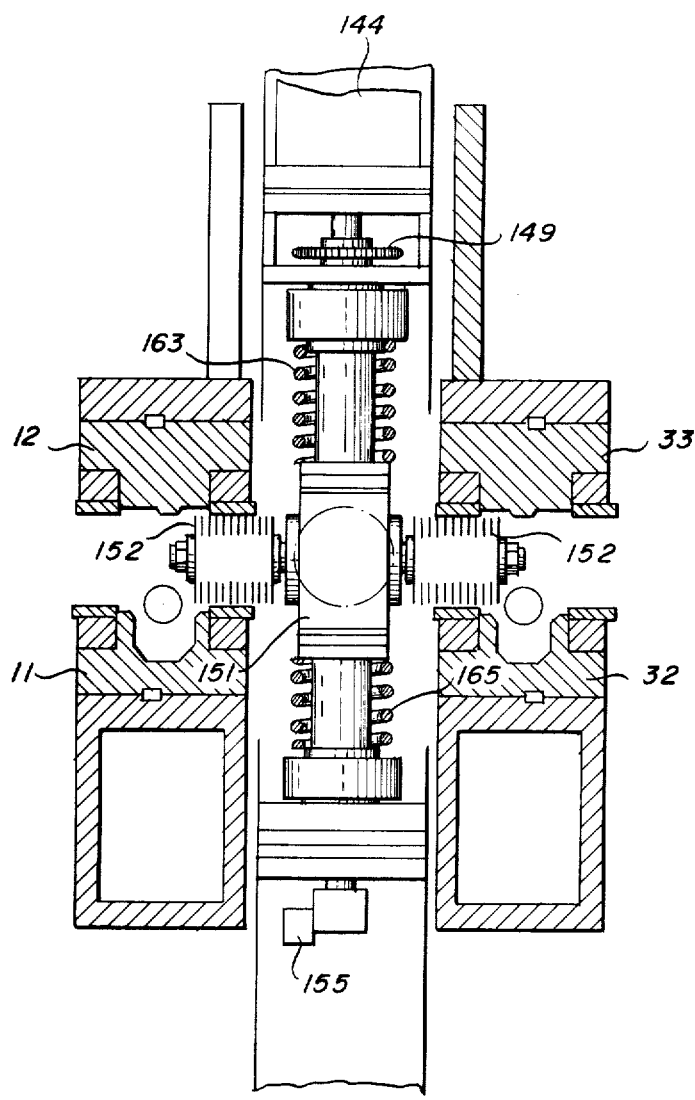
FIG. 23 is a vertical sectional view thereof.

When both the edge preparation device 81 and the undersurface scribing device 82 are set in the manner described, the shear unit moving cylinder 69 is actuated to retract the shear unit 65 over the carriage 63 out of the strip line or path. During the shear unit 65 being retracted, the cutting tools 100 cut off the edges of the strips $S_1$ and $S_2$ in the form as shown in FIG. 18 while the scribers 120 scribe the undersurfaces of the strips $S_1$ and $S_2$ to remove the scales and consequently the projections 180 are produced at the undersurfaces of the strips as shown in FIG. 11. These projections 180 are substantially uniform across the strips because the scribers 120 are pressed against the undersurfaces of the strips under the constant forces of the springs 98 and because the pressure rollers 97 are pressed against the upper surfaces of the strips under the constant forces of the springs 125.

While the shear unit 65 is being retracted out of the strip path, the upper electrodes 12 and 33 are raised away from the strips (See FIG. 28(F)). This step is however not required when the upper electrode 12 and 33 have not been lowered in the step shown in FIG. 28(D).

When the trailing and leading edges of the strips are cut off in the manner described above, the distance between the new trailing and leading edges is equal to L which is constant regardless of the thickness of the strips while the distance between the entrance-side electrodes 11 and 12 and the discharge-side electrodes 32 and 33 is W which is a function of the thickness of the strips because the stroke of the cylinder 6 set by the positioning device 7 is set depending upon the thickness of the strips.

After the shear unit 65 is completely retracted out of the strip line, the crop discharge device 80 is brought to the side of the shear unit 65 close to the strip path, and the shaft 87 is rotated so that the crop discharge plate 90 is brought to the horizontal position indicated by the solid lines in FIG. 12. Thereafter the shaft 87 is displaced in the direction indicated by the arrow X in FIGS. 11 and 12, and is placed between the upper and lower cutter holders 76 and 71, and then the shaft 87 is rotated through 90° so that the crop discharge plate 90 may be brought to the vertical position indicated by the broken lines in FIG. 11 with the projections 88 and 89 fitted into the grooves 85 and 86, respectively.

Next the shaft 87 is displaced in the direction indicated by the arrow Y so that the crop discharge plate 90 pushes the crops $S_1'$ and $S_2'$ toward the side of the lower cutting holder 71 remote from the strip path. Consequently, the crops $S_1'$ and $S_2'$ are discharged through the chute 181 into the bucket 182. Immediately after the crops $S_1'$ and $S_2'$ have been discharged, the crop discharge device 80 is returned to its initial position.

After the upper electrodes 12 and 13 have been raised away from the strips, the electrode frame moving cylinder 8 is extended over a predetermined stroke in the forward direction while the cylinder 27 is extended over a predetermined stroke in the rear direction so that both the entrance- and discharge-side electrode mounting frames 3 and 26 are moved toward each other, that is, toward the edges of the strips. Thereafter the electrode frame holding cylinders 9 and 28 are extended so that the electrode holding block 10 is interposed between the entrance-side electrode mounting frame 3 and the entrance-side strip clamp mounting frame 5 while the electrode holding block 29, between the discharge-side electrode holding frame 5 and the discharge-side strip clamp mounting frame 24. Therefore the entrance-side electrode mounting frame 3 is coupled to the entrance-side strip clamp mounting frame 5 while the discharge-side electrode mounting frame 26, to the discharge-side clamp mounting frame 24. As a result, the distance between the electrodes 11, 12, 32 and 33 on the one hand and the strip clamps 17, 18, 38 and 39 on the other hand may be maintained at a predetermined constant distance s (See FIG. 28(G)). The distance between the front surfaces of the entrance-side electrodes 11 and 12 and leading edge of the succeeding strip $S_2$ and the distance between the rear surfaces of the discharge-side electrodes 32 and 33 and the trailing edge of the preceding strip $S_1$ are both maintained at a distance K. The distance between the rear surfaces of the entrance-side electrodes 11 and 12 and the front surfaces of the entrance-side clamps 17 and 18, that is the displacement of the electrodes 11 and 12 in the forward direction, and the distance between the front surfaces of the discharge-side electrodes 32 and 33 and the rear surfaces of the discharge-side strip clamps 38 and 39; that is the displacement of the electrodes 32 and 33 in the reverse direction are both s (See FIG. 28(G)).

In cooperation with the electrode frame moving cylinders 8 and 27 and the electrode frame holding cylinders 9 and 28, the upset cylinder 6 is also extended so as to cause the leading edge of the succeeding strip $S_2$ to make contact with the trailing edge of the preceding strip $S_1$.

The marginal length K of the trailing or leading edge of the strip $S_1$ or $S_2$ extended out of the electrodes 32 and 33 or 11 and 12, is expressed in the following equation:

$$K = \{(W - L) - 2S\} \times \tfrac{1}{2}$$

The distance W between the front surfaces of the entrance-side electrodes 11 and 12 and the rear surfaces of the discharge-side electrodes 32 and 33 may be suitably selected depending upon the thickness of the strips. The cutting width L; that is, the distance between the trailing edge and the leading edge after the strips $S_1$ and $S_2$ have been cut off by the shear unit 65 is constant while the displacement S of the electrodes 11, 12, 32 and 33 remains unchanged. Therefore the marginal length K may be selected for the optimum flash welding between the strips $S_1$ and $S_2$.

After the marginal length K has been suitably selected, the hydraulic cylinders 15 and 36 are actuated to lower the electrode clamping cylinders 13 and 34 as well as the upper electrodes 12 and 33 and then the clamping cylinders 13 and 34 are actuated so that the succeeding strip $S_2$ is clamped between the electrodes 11 and 12 while the preceding strip $S_1$, between the electrodes 32 and 33 (FIG. 28(H)).

Next the current is made to flow from the transformer unit 43 to the lower electrodes 11 and 32 while the upset cylinder 6 is extended to make the leading edge of the succeeding strip $S_2$ into light contact with the trailing edge of the preceding strip $S_1$. Therefore the flashing action is created at the interface between the trailing and leading edges. When the trailing and leading edges are molten, the upset cylinder 6 forces the leading edge against the trailing edge, making the weld between them. (See FIG. 28 (I)). Since the undersurfaces of the strips $S_1$ and $S_2$ are scribed by the scribers 120 to produce the projections 180 (See FIG. 21), the very intimate contact between the lower electrodes 11 and 32 and the undersurfaces of the succeeding and preceding strips $S_2$ and $S_1$ may be ensured, and consequently the satisfactory electrical contact therebetween may be ensured. Furthermore the leading and trailing edges of the strips are machined in the form shown in FIG. 18, so that the satisfactory weld joint may be attained.

Figure 28:
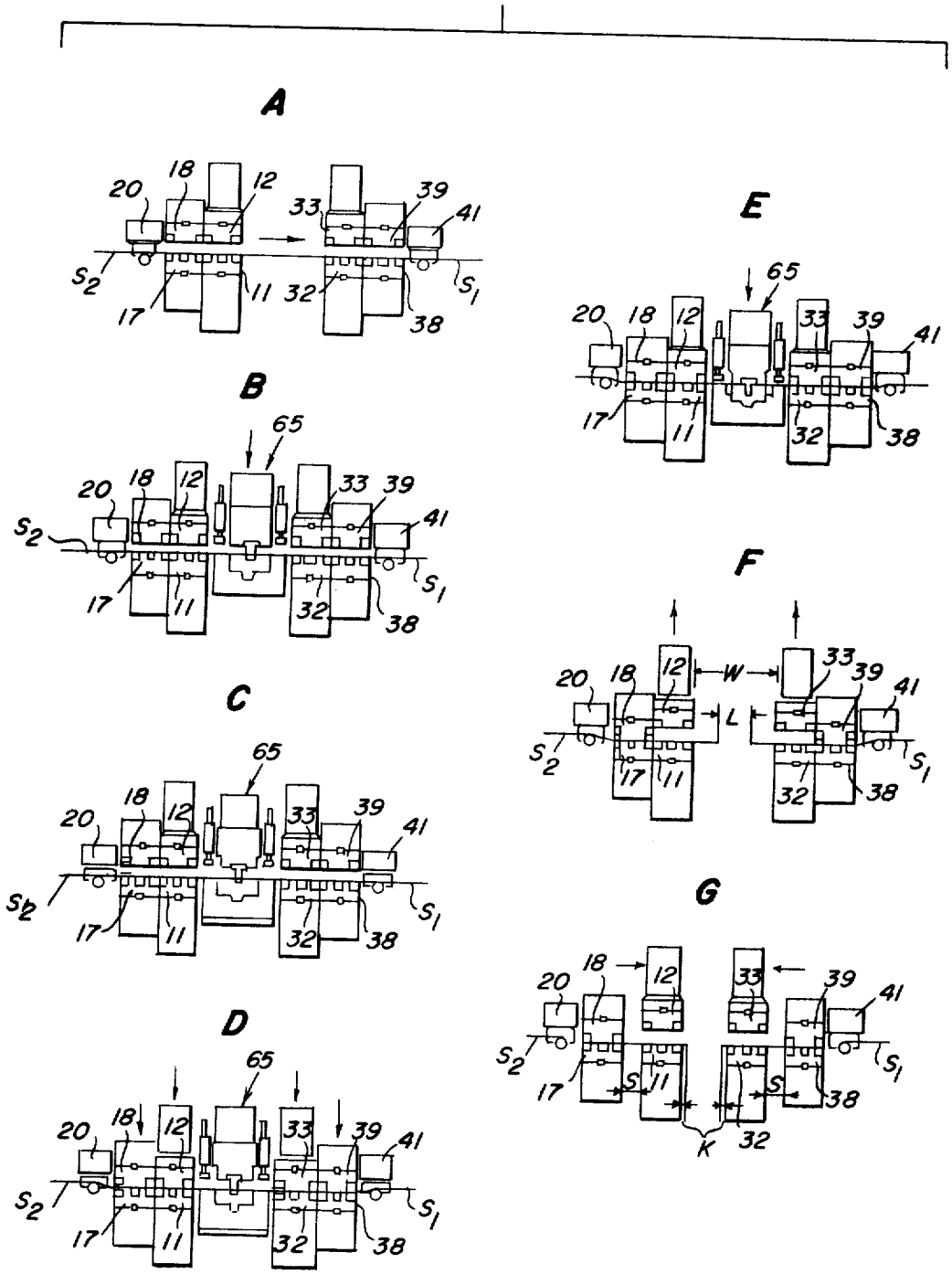
Figure 28:
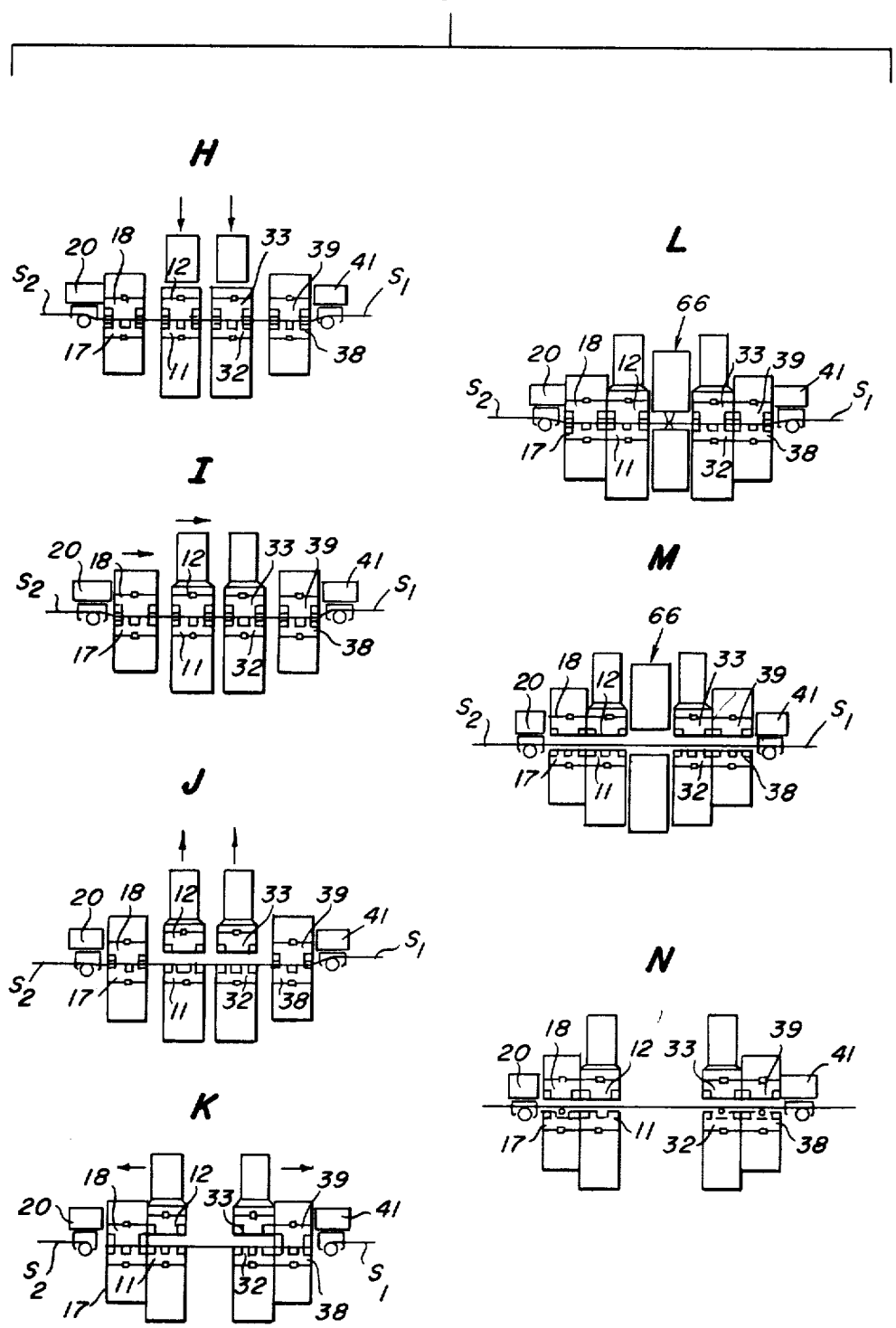

After welding, the clamping cylinders 13 and 34 are actuated and then the hydraulic cylinders 15 and 36 are actuated to raise the upper electrodes 12 and 33 away from the lower electrodes 11 and 32 (See FIG. 28(J)). Thereafter, the electrode frame holding cylinders 9 and 28 are actuated to raise the electrode holding blocks 10 and 29 so that the entrance- and discharge-side electrode mounting frames and 3 and 36 are released from the entrance- and discharge-side strip clamp mounting frames 5 and 24, respectively. Next the electrode frame moving cylinders 8 and 27 are actuated so that the entrance-side electrode mounting frame 3 is displaced in the reverse direction while the discharge-side electrode mounting frame 26 is displaced in the forward direction until the electrodes mounted on these frames 3 and 26 are made into contact with the entrance-side strip clamps 17 and 18 and the discharge-side strip clamps 38 and 39 respectively. Next the hydraulic cylinders 15 and 36 are actuated first and then the clamping cylinders 34 are actuated to lower the upper electrodes 12 and 33 so that the strips $S_1$ and $S_2$ are clamped again between the upper and lower electrodes as shown in FIG. 28 (K).

As described above after the shear unit 65 has cut off the edges of the strips $S_1$ and $S_2$, it is retracted out of the strip line or path. During the flash welding operation, the flash trimmer unit 66 must be brought to the position at which the unit 66 is in line with the welding line. The welding line is located at the midpoint between the front surfaces of the entrance-side electrodes 11 and 12 and the rear surfaces of the discharge-side electrodes 32 and 33. After the crops $S_1'$ and $S_2'$ have been discharged in the manner described elsewhere, the motor 62 is driven to rotate the screw rods 57 and 56, thereby displacing the frames 49 and 51 forwardly or backwardly so that the axes of the upper and lower guides beams 52 and 53 may be aligned with the welding line. Thereafter the carriage shift cylinder 64 is actuated again to displace the trimmer unit 66 so that the line of the cutting tools may be aligned with the welding line. Next the hydraulic cylinder 170 is actuated to lower the upper cutter holder 171 until the upper rollers 173 are made into contact with the lower rollers 169.

After the strips are clamped again by the electrodes, the flash trimmer unit moving cylinder 70 is actuated to displace the unit 66 into the strip path. Since the upper tool holder 171 is suspended through the linkage, when the upper leading rollers 173 strike against the strip, they ride over the upper surface of the strip so that the trailing rollers 173 are also raised by a height corresponding to the thickness of the strip. As the flash trimmer unit 66 is forced into the strip path transversely thereof, the upper and lower cutting tools 172 and 168 remove the flash from the upper surface and the undersurface of the joined strip. (See FIG. 28(L)).

After the flash has been removed, the hydraulic cylinder 170 is actuated to raise the upper tool holder 171. The upper electrodes 12 and 33, the upper strip clamps 18 and 39 and the side guides 20 and 41 are released and returned to the initial position (See FIG. 28(M)). Thereafter the flash trimmer unit moving cylinder 70 is actuated in the reverse direction so as to retract the unit 66 out of the strip path as shown in FIG. 28(N). Next the strip line is driven again so that the succeeding strip $S_2$ joined to the trailing edge of the preceding strip $S_1$ may be transported to the next processing station.

It is to be understood that the present invention is not limited to the preferred embodiment described above and that various modifications can be effected without departing the true spirit of the present invention.

The flash welding apparatus in accordance with the present invention has the following novel features and advantages:

I. Since the leading edge of the succeeding strip may be automatically joined at a high speed to the trailing edge of the preceding strip, the productivity may be remarkably increased.

II. Flash welding may be carried out under the optimum conditions so that the highly reliable welds may be obtained.

III. The leading edge of the succeeding strip and the trailing edge of the preceding strip are accurately positioned, rigidly clamped and then simultaneously cut off so that the re-adjustment of the position of the strips in preparation for welding step may be eliminated. The cut off trailing and leading edges may be held accurately in parallel with each other. Futhermore the use of the gage bars, cross-adjusts and so on used in the prior art may be eliminated.

IV. The marginal length K of the strips may be optimumly selected depending upon the thickness of the strips to be joined.

V. Since both the shear unit and flash trimmer unit may be selectively advanced into and retracted out of the strip path, the inspection and maintenance of these units may be much facilitated, and consequently the idle time may be considerably reduced.

VI. Since the welding line may be previously detected, the alignment of the trimmer unit with the welding may be much facilitated. Since the automatic flash trimmer unit is provided, the full-automatic flash welding apparatus is provided.

VII. Since the distance between the entrance- and discharge-side electrodes is longer, the cleaning, inspection amd maintenance of the electrodes may be much facilitated.

VIII. Since the position of the electrodes as well as the strip clamps may be freely selected depending upon the thickness of the strips to be joined, the various steps may be sequentially and automatically accomplished.

IX. Since the stopper for positioning the trailing edge of the preceding strip and the leading edge of the succeeding strip is formed integral of and extended out of the upper of lower cutter holder, it is rigid in construction and is prevented from being damaged by scales or the like. Furthermore, the accurate positioning of the leading and trailing edges may be attained.

X. Since the crops are automatically discharged out of the flash welding apparatus, the operation may be safeguarded and saving in labor may be attained.

XI. After the edges of the strips to be joined are cut off, the new leading and trailing edges may be machined in any forms so as to attain the optimum welding conditions. In addition, the edge preparation may be carried out while the strips are still clamped after the leading and trailing edges are clamped, and simultaneously cut off so that the edges may be machined with desired dimensional tolerances and the accurate pallelism between the edges may be maintained. Furthermore the position of the cutting tools may be adjusted depending upon the thickness of the strips so that the optimum edge preparation may be attained.

XII. Since the scales on the undersurfaces of the strips are removed, the very satisfactory electrical contact may be established between the electrodes and the strips so that the highly reliable welds may be obtained and the life of the electrodes may be increased.

VIII. Every time when the shear unit is brought into the operative position transversely of the strip path, the electrodes may be thoroughly cleaned by the electrode cleaning device. The cleaning device may positively clean the clamping surfaces of the electrodes. The cleaning of the clamping surfaces has been so far impossible by the prior art cleaning devices. Therefore the more satisfactory electrical contact may be established between the electrodes and the strips so that the welding efficiency may be considerably improved. In addition the sludges attached to the side surfaces of the electrodes may be completely removed so that the electric power loss may be minimized. Furthermore the interval of the periodic inspection and maintenance may be increased.

XIV. In the flash trimmer unit, the rollers of the upper tool holder are made into contact with the rollers of the lower tool holder under pressure, and when the rollers of the upper tool holder ride over the upper surface of the strip the spacing between the upper and lower cutting tools may be automatically adjusted. Therefore any special means for adjusting the spacing will not be required. In addition, the spacing may be automatically adjusted depending upon the thickness of the strip as the flash trimmer unit is advanced into the strip path transversely thereof. Therefore the automation of the flash welding apparatus as a whole may be much facilitated.

What is claimed is:

1. A flash welding apparatus for strip material movable along a path of travel, comprising a first strip clamp mounting frame movable forwardly or backwardly of the strip path, a first strip clamp means mounted on said frame, a second strip clamp mounting frame immovable forwardly or backwardly of the strip path, a second strip clamp means mounted on said second frame, entrance and discharge side electrode mounting frames movable forwardly or backwardly of the strip path, welding electrode means mounted on said electrode mounting frames, said last mentioned frames being releasably engageable with said first and second strip clamp mounting frames, a shear unit, a flash trimmer unit, first and second gantry-shaped frames arranged transversely outwardly of said entrance and discharge electrode mounting frames, respectively, for movement forwardly or backwardly of the strip path, said first and second gantry-shaped frames being interconnected with upper and lower guide beams extended transversely of the strip path between said gantry-shaped frames, a carriage disposed transversely outwardly of one of said gantry-shaped frames, for movement transversely of the strip path, said shear unit and said flash trimmer unit being mounted on said carriage for movement transversely of said strip material so that either said shear unit or said flash trimmer unit may be retractably displaced into the space defined between the upper and lower transverse guide beams.

2. A flash welding apparatus as set forth in claim 1 wherein hydraulic cylinder means are operatively coupled to said first and second strip clamp mounting frames and said entrance- and discharge-side electrode mounting frames, said hydraulic cylinder means being extendable and retractable forwardly and backwardly of the strip path.

3. A flash welding apparatus as set forth in claim 2 wherein vertically extendably and retractable hydraulic cylinders are mounted upon said entrance- and discharge-side strip clamp mounting frames in such a way that the piston rod of each hydraulic cylinder is operatively coupled to an electrode holding block which may be advanced between the entrance- or discharge-side strip clamp mounting frame and the corresponding electrode mounting frame, thereby engaging them with each other.

4. A flash welding apparatus as set forth in claim 3 wherein an upset cylinder is mounted on a welder bed in parallel with the strip path and is operatively coupled to a position setting means and has its position rod operatively coupled to said first movable strip clamp mounting frame.

5. A flash welding apparatus as set forth in claim 3 wherein a cotter with a surface tapered in the direction in parallel with the strip path is fitted into a cotter block mounted on a welder bed for slidable movement therein forwardly or backwardly of said strip path, and said second immovable strip clamp mounting frame is attached to said cotter.

6. A flash welding apparatus as set forth in claim 2 wherein an upset cylinder is mounted on a welder bed in parallel with the strip path and is operatively coupled to a position setting means and has its piston rod operatively coupled to said first movable strip clamp mounting frame.

7. A flash welding apparatus as set forth in claim 2 wherein a cotter with a surface tapered in the direction in parallel with the strip path is fitted into a cotter block mounted on a welder bed for slidable movement therein forwardly or backwardly of said strip path, and said second immovable strip clamp mounting frame is attached to said cotter.

8. A flash welding apparatus as set forth in claim 1 wherein vertically extendable and retractable hydraulic cylinders are mounted upon said entrance- and discharge-side strip clamp mounting frames in such a way that the piston rod of each hydraulic cylinder is operatively coupled to an electrode holding block which may be advanced between the entrance- or discharge-side strip clamp mounting frame and the corresponding electrode mounting frame, thereby engaging them with each other.

9. A flash welding apparatus as set forth in claim 8 wherein an upset cylinder is mounted on a welder bed in parallel with the strip path and is operatively coupled to a position setting means and has its piston rod operatively coupled to said first movable strip clamp mounting frame.

10. A flash welding apparatus as set forth in claim 8 wherein a cotter with a surface tapered in the direction in parallel with the strip path is fitted into a cotter block mounted on a welder bed for slidable movement therein forwardly or backwardly of said strip path, and said second immovable strip clamp mounting frame is attached to said cotter.

11. A flash welding apparatus as set forth in claim 1 wherein an upset cylinder is mounted on a welder bed in parallel with the strip path and is operatively coupled to a position setting means and has its piston rod operatively coupled to said first movable strip clamp mounting frame.

12. A flash welding apparatus as set forth in claim 1 wherein a cotter with a surface tapered in the direction in parallel with the strip path is fitted into a cotter block mounted on a welder bed for slidable movement therein forwardly or backwardly of said strip path, and said second immovable strip clamp mounting frame is attached to said cotter.

13. A flash welding apparatus as set forth in claim 1 wherein said shear unit comprises a lower cutter holder having lower cutters held on the upper portion thereof and mounted on the lower side of a frame of said shear unit, and an upper cutter holder having upper cutters held on the lower portion thereof and suspended from the upper side of said frame for vertical movement toward or away from said lower cutter holder.

14. A flash welding apparatus as set forth in claim 1 wherein said flash trimmer unit comprises
a lower tool holder mounted on the lower side of a frame of said flash trimmer unit and having cutting tools securely held upon the upper surface thereof, and
an upper tool holder suspended from the upper side of said frame for vertical movement toward or away from said lower tool holder in parallel therewith, said upper tool holder having upper cutting tools securely held on the lower surface thereof.

15. A flash welding apparatus as set forth in claim 1 wherein attached to a portion close to the strip path of a frame of said shear unit are a plurality of cutting tools for machining the leading edge of the succeeding strip and the trailing edge of the preceding strip after said strips are cut off by said shear unit, said cutting tools being so arranged as to be adjustable in height, and constructed so that the line of cutting may be adjusted and the tools separated from the lower base.

16. A flash welding apparatus as set forth in claim 1 wherein a positioning stopper is transversely extended from the lower surface of an upper cutter holder between the front and rear side surfaces thereof and is extended downwardly beyond cutting edges of the upper cutters attached to said front and rear side surfaces.

17. A flash welding apparatus as set forth in claim 1 wherein a positioning stopper is transversely extended from the upper surface of a lower cutter holder between the front and rear side surfaces thereof and is extended upwardly beyond the cutting edges of the lower cutters attached to said front and rear side surfaces.

18. A flash welding apparatus as set forth in claim 1 wherein a transverse center groove is formed in the bottom of a transverse recess of a lower cutter holder so as to receive therein a positioning stopper,
a plurality of grooves are formed in said bottom in parallel with said transverse center groove on both sides thereof and spaced apart therefrom and from each other by a suitable distance, a shaft is disposed between said lower cutter holder and an upper cutter holder for rotation about its axis and movement not only in the axial direction thereof but also in the transverse direction, and
a crop discharge plate with a plurality of projections so formed as to be fitted into said plurality of transverse grooves, respectively, of said lower cutter holder is attached to one end of said shaft on the side close to said upper and lower cutter holders.

19. A flash welding apparatus as set forth in claim 1 wherein attached to the portion close to the strip path of a frame of said shear unit are verticaly movable scribers.

20. A flash welding apparatus as set forth in claim 1 wherein an electrode cleaning device including first cleaning means for cleaning the side surfaces of the electrodes and second cleaning means for cleaning the clamping surfaces of the electrodes is mounted on the portion close to said strip path of a frame of said shear unit.

* * * * *

UNITED STATES PATENT AND TRADEMARK OFFICE
CERTIFICATE OF CORRECTION

PATENT NO. : 4,096,375
DATED : June 20, 1978
INVENTOR(S) : Yoshiharu Fujino, Iwane Chiba, Toshimi Chiyonobu, Tomihisa Takahata, Yasuhiko Kachi It is certified that error appears in the above-identified patent and that said Letters Patent are hereby corrected as shown below:

Assignee: Ishikawajima-Harima Jukogyo Kabushiki Kaisha, Tokyo, Japan and Nippon Kokan Kabushiki Kaisha, Tokyo, Japan.

Signed and Sealed this

Twenty-seventh Day of February 1979

[SEAL]

Attest:

RUTH C. MASON
Attesting Officer

DONALD W. BANNER
Commissioner of Patents and Trademarks